(12) United States Patent
Shattil

(10) Patent No.: US 8,098,751 B2
(45) Date of Patent: *Jan. 17, 2012

(54) SOFTWARE ADAPTABLE HIGH PERFORMANCE MULTICARRIER TRANSMISSION PROTOCOL

(75) Inventor: Steve Shattil, Boulder, CO (US)

(73) Assignee: Lot 41 Acquisition Foundation, LLC, Wilmington, DE (US)

( * ) Notice: Subject to any disclaimer, the term of this patent is extended or adjusted under 35 U.S.C. 154(b) by 664 days.

This patent is subject to a terminal disclaimer.

(21) Appl. No.: 12/177,619

(22) Filed: Jul. 22, 2008

(65) Prior Publication Data

US 2008/0310484 A1    Dec. 18, 2008

Related U.S. Application Data

(63) Continuation of application No. 10/730,452, filed on Dec. 8, 2003, now Pat. No. 7,418,043, and a continuation-in-part of application No. 09/906,257, filed on Jul. 16, 2001, now Pat. No. 6,686,879.

(60) Provisional application No. 60/431,877, filed on Dec. 9, 2002, provisional application No. 60/435,439, filed on Dec. 20, 2002, provisional application No. 60/219,482, filed on Jul. 19, 2000.

(51) Int. Cl.
    *H04K 1/10*    (2006.01)
(52) U.S. Cl. .......................................... 375/260; 455/59
(58) Field of Classification Search .................. 375/260; 455/59
    See application file for complete search history.

(56) References Cited

U.S. PATENT DOCUMENTS

| | | | |
|---|---|---|---|
| 6,128,350 | A | 10/2000 | Shastri et al. |
| 6,130,918 | A | 10/2000 | Humphrey et al. |
| 6,504,862 | B1 | 1/2003 | Yang et al. |
| 6,985,533 | B2 | 1/2006 | Attallah et al. |
| 7,075,999 | B2 | 7/2006 | Redfern |
| 2002/0061068 | A1 | 5/2002 | Leva et al. |
| 2002/0168016 | A1 | 11/2002 | Wang et al. |

OTHER PUBLICATIONS

Natarajan, "Throughput enhancement in TDMA through carrier interferometry pulse shaping", 52nd Vehicular Technology Conference, 2000, IEEE VTS-FAII VTC 2000. vol. 4, Sep. 24-28, 2000 pp. 1799-1803 vol. 4.
Nassar, "Introduction of carrier interference to spread spectrum multiple access", 1999 Emerging Technologies Symposium Wireless Communciations and Systems, Apr. 12-13, 1999 pp. 4.1-4.5.
Wiegandt, "Overcoming peak-to-average power ratio issues in OFDM via carrier-interferometry codes", VCT 2001 Fall, IEEE VTS 54th Vehicular Technology Conference, 2001, vol. 2, Oct. 7-11, 2001 pp. 660-663 vol. 2.
ITU-T G.992.1, "Asymmetric Digital Subscriber Line (ADSL) transceivers" Jun. 1999, (G.dmt) pp. 10 and 40-42.
Natarajan, "Innovative pulse shaping for high-performance wireless TDMA", IEEE Communications Letters, vol. 5, Issue 9, Sep. 2001 pp. 372-374. Zhiqiang, "Ultra wideband DS-CDMA via innovations in chip shaping", IEEE VTS 54th Vehicular Technology Conference, 2001. VTC 2001 Fall. vol. 4, Oct. 7-11, 2001 pp. 2470-2474 vol. 4.
Natarajan, "Crest factor considerations in MC-CDMA with carrier interferometry codes", PACRIM. 2001 IEEE Communications Pacific Rim Conference on Computers and signal Processing, 2001, vol. 2, Aug. 26-28, 2001 pp. 445-448 vol. 2.

*Primary Examiner* — Juan A Torres
(74) *Attorney, Agent, or Firm* — Connolly Bove Lodge & Hutz LLP

(57) ABSTRACT

Techniques for reducing peak-to-average power in multicarrier transmitters employ peak cancellation with subcarriers that are impaired by existing channel conditions. The use of Carrier Interferometry (CI) coding further improves the effectiveness of peak reduction. CI coding can also be impressed onto pulse sequences in the time domain, which enhances spectral selection and facilitates peak-power control.

30 Claims, 13 Drawing Sheets

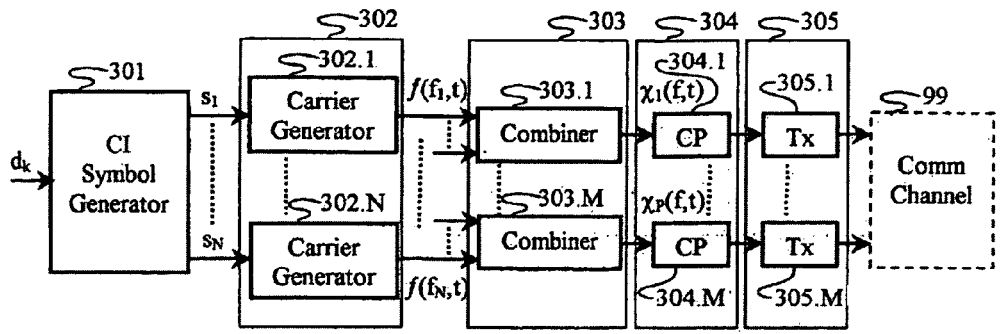
FIG. 10A
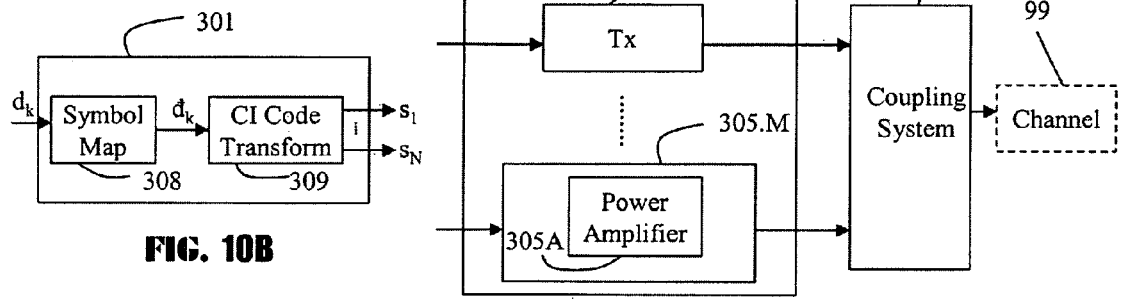
FIG. 10B
FIG. 10D
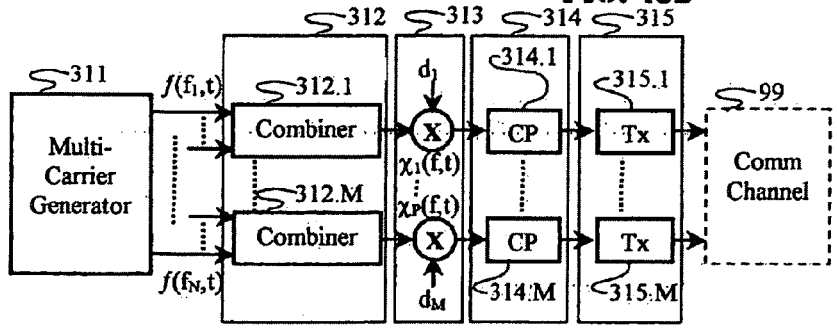
FIG. 10C

SOFTWARE ADAPTABLE HIGH PERFORMANCE MULTICARRIER TRANSMISSION PROTOCOL

RELATED APPLICATIONS

The present application is a continuation of U.S. patent application Ser. No. 10/730,452, which claims priority to Provisional Appl. No. 60/431,877, filed on Dec. 9, 2002 and Provisional Appl. No. 60/435,439, filed on Dec. 20, 2002, and is a Continuation in Part of patent application Ser. No. 09/906,257, filed Jul. 16, 2001 (now U.S. Pat. No. 6,686,879), which is a non-provisional application of U.S. Pat. Appl. 60/219,482, filed on Jul. 19, 2000.

FIELD OF THE INVENTION

The present invention relates to multi-carrier communications, and in particular, to Carrier Interferometry.

BACKGROUND OF THE INVENTION

Multi-carrier modulation can result in a high peak-to-average power ratio (PAPR) of the transmitted signals. The PAPR is defined as the ratio of a signal's peak power level to its average power level. In the case of conventional OFDM modulation, the amplitude of the transmission is characterized by a substantially Gaussian-shaped probability distribution function. This Gaussian distribution indicates the possibility that some time-domain samples of the transmission may have amplitudes that are very high compared to the average sample amplitude. The resulting PAPR is much higher for conventional multi-carrier signals than for single-carrier signals. This is due to the probability of substantially constructive interference between the carriers.

The high PAPR for conventional multi-carrier signals imposes significant constraints on the transmission circuitry, and can greatly complicate the analog circuitry required for high-fidelity transmission. For example, a high PAPR translates into a large dynamic range at the inputs of digital-to-analog converters (DACs) and analog-to-digital converters (ADCs), necessitating a large number of bits for resolution. This can significantly increase a receiver's cost and complexity. Highly complex filters and amplifiers must be employed to handle high PAPR and the increased resolution. Furthermore, high PAPR results in higher power consumption in the transceiver circuits, further increasing the cost of the circuits and systems used in the analog front end.

Many prior-art techniques adapted to control the PAPR of multi-carrier transmissions employ clipping to attenuate signal amplitudes that exceed a selected threshold. This results in signal loss and an increase in the bit-error rate (BER). Clipping effectively introduces a cancellation impulse signal in the time-domain signal. As known in the art, a time-domain impulse corresponds to additive noise across all subchannels in the frequency domain. Thus clipping effectively reduces the signal-to-noise ratio for all subchannels in the modulated signal. This is not the case for a CI signal. Rather, an impulse constructed from user-allocated subcarriers can be applied to the particular CI phase-space(s) of interest without affecting other CI-signal phase spaces. This approach either localizes signal degradation (which is an insignificant problem when channel coding is employed over multiple phase spaces) or slightly reduces bandwidth efficiency, such as by requiring additional information to be sent to the receiver to compensate for PAPR-mitigating signal distortions.

A variety of PAPR-reduction methods are disclosed in U.S. Pat. No. 5,623,513, U.S. Pat. No. 5,787,113, U.S. Pat. No. 5,768,318, and U.S. Pat. No. 5,835,536.

Various approaches have been developed to minimize the number of samples that require clipping. According to one class of techniques, data symbols are coded so that the resulting code words reside in a set of transmission symbols that reside below a predetermined PAPR threshold. These techniques reduce bandwidth efficiency due to the resulting coding overhead.

Another well-known approach applies a phase rotation to some of the subchannels to reduce the probability that a predetermined PAPR threshold is exceeded. Assuming a low probability that the original signal exceeds the PAPR threshold, the probability that both the original signal and the transformed signal exceed the threshold is approximately the square of the low probability. This is a particularly useful technique that can be applied to CI signaling because CI signals exhibiting high peaks are relatively rare. In a closely related technique, different data sequences (e.g., a cyclic rotation of the data) for a given data block may be generated. The sequence having the lowest PAPR is then selected for transmission. These and related approaches can greatly reduce clipping. However, control-signal overhead is required to inform the receiver of changes to the transmission signal.

Another approach estimates and corrects the effects of clipping at the receiver. An estimate of the clipping error is generated at the receiver and used to reconstruct a frequency domain compensation signal to remove the effects of any clipping.

In another PAPR-reduction technique, a normalizer is employed for determining a maximum-amplitude value from a plurality of data samples, and then dividing each of the data samples by the maximum amplitude value to produce normalized amplitude values. The normalized values may be provided with non-linear amplification for at least a subset of the values.

Another PAPR-reduction technique employs reserved sub-carriers to cancel peaks. A bandwidth-efficient method of reducing the PAPR in DMT transmissions is disclosed in Gatherer and Polley, "Controlling clipping probability in DMT transmission", Proceedings of the Asilomar Conference on Signals, Systems, and Computers, (1997), pp. 578-584, the contents of which are herein incorporated by reference. A similar method of reducing PAPR is disclosed in T. Starr, J. M. Cioffi and P. J. Silverman, "Understanding Digital Subscriber Line Technology", published by Prentice-Hall, 1999, which is incorporated by reference. A predetermined number of subcarriers are used to inject symbols that reduce the PAPR of a DMT signal, and an iterative algorithm teaches which symbols are injected. However, to reduce the PAPR significantly, up to 20% of the sub-carriers are required to inject the symbols, leaving fewer sub-carriers for carrying information. In addition, this method is complex. It requires iterative minimization of non-linear functions and computation of several fast Fourier transforms.

Each of these PAPR approaches can be used in combination with CI. The benefits of such combinations yield a higher performance budget from which advantageous combinations of PAPR, bandwidth efficiency, spectral roll-off, and BER are achieved. The benefits of low initial PAPR in CI modulation enhance the effectiveness of prior-art PAPR-reduction techniques.

SUMMARY OF THE INVENTION

CI coding can greatly reduce the PAPR of multicarrier signals and enhance other techniques used for PAPR mitigation. The low PAPR enabled by CI coding translates into a smaller dynamic range at the inputs of digital-to-analog converters and analog-to-digital converters, enabling a smaller number of bits for resolution. This can significantly reduce a receiver's cost and complexity. Furthermore, low PAPR enables much lower power consumption and distortion in the transceiver circuits, further reducing the cost of the circuits and systems used in the RF front end.

CI coding spreads data symbols across subcarriers, which combine to produce superposition pulse waveforms. Sinc-shaped CI pulses have the same spectral roll-off, but lower PAPR, compared to conventional multicarrier modulation. Windowing, or pulse shaping, can further reduce the PAPR of CI signaling by reducing the steep spectral roll-off. Similarly, other PAPR-reduction techniques result in lower spectral efficiency and/or a higher error floor.

PAPR-reduction techniques other than basic CI coding trade off spectral efficiency or BER performance for PAPR benefits. This characterizes one type of performance budget that is associated with a particular transmission protocol. At one extreme is multicarrier signaling with high spectral efficiency and high PAPR. At the other extreme is single-carrier modulation characterized by extremely low PAPR and low bandwidth efficiency. CI coding enables multicarrier modulation to achieve close to the largest performance budget possible. This enables multicarrier communications to achieve PAPR benefits (and the related performance metrics) associated with single-carrier modulation.

Improved methods for optimizing the balance of performance metrics in a PAPR-reduction method are disclosed herein. In one aspect of the invention, the necessary bandwidth required to improve PAPR performance employs spectrum that is sub-optimal for data communications. For example, peak-reduction signals (e.g., cancellation signals) are transmitted at sub-carrier frequencies experiencing deep fading or strong interference. These sub-optimal subcarriers are typically unloaded subcarriers (i.e., no data is transmitted on the sub-optimal subcarriers). Thus, the loss of bandwidth efficiency due to PAPR mitigation is advantageously positioned to coincide with a reduction in bandwidth efficiency due to channel impairments.

Another aspect of the invention exploits a novel transceiver design that mitigates the effects of a high-PAPR transmission. In particular, a high-PAPR signal (e.g., a multicarrier or amplitude-shift key signal) is synthesized by generating low-PAPR signal components that are amplified prior to combining. CI signaling allows multiple sub-carrier components to be combined into low-PAPR signals prior to amplification, thus substantially reducing the number of power amplifiers needed.

In another aspect of the invention, a multicarrier signal is generated by impressing one or more CI codes onto a sequence of pulse waveforms. This facilitates PAPR control prior to modulation with data.

Other objects and advantages of the present invention will be apparent to those of ordinary skill in the art having reference to the following specification together with its drawings.

BRIEF DESCRIPTION OF THE DRAWINGS

The present invention is described with reference to the accompanying drawings:

FIG. 10A illustrates a CI transmitter adapted to reduce PAPR of multicarrier signals.

FIG. 10B illustrates an embodiment of a CI symbol generator.

FIG. 10C illustrates an alternative embodiment of a CI transmitter.

FIG. 10D illustrates further optional transmitter elements that may be incorporated into various embodiments of the invention.

PREFERRED EMBODIMENTS

The CI system of the invention provides for control and programmability of the frequency spectrum of multicarrier and single-carrier signals. CI signal synthesis and analysis (i.e., decomposition) may employ combinations of block transforms and sliding transforms, such as described in U.S. patent application Ser. No. 10/414,663, entitled "Orthogonal Superposition Coding for Direct-Sequence Communications," filed on Apr. 16, 2003, and incorporated by reference herein, CI provides a common signal-processing platform that can transmit and receive a broad range of communication waveforms, CI generates multi-carrier wavelets used to build communication waveforms and employs orthogonal multi-carrier wavelet bases to process received signals. Each wavelet is made from simple sinusoids. Accordingly, CI processes all kinds of waveforms as weighted combinations of sinusoids.

Figure 1A:
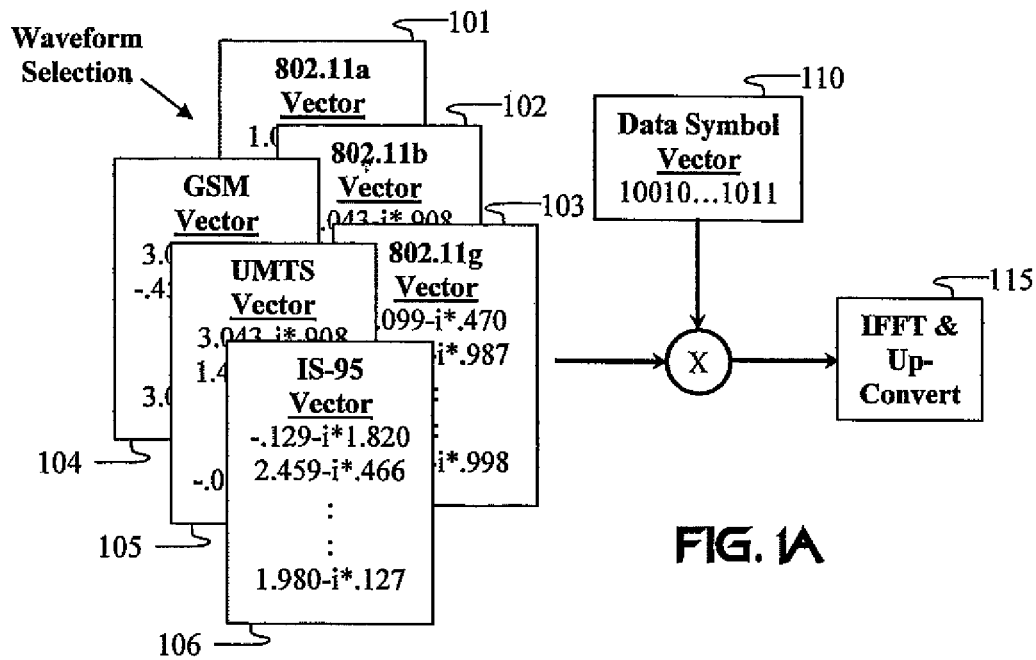
FIG. 1A illustrates a software-defined transmitter based on a CI coder. Different CI code vectors are used to synthesize the PHY-layer parameters of a variety of transmission protocols.

One aspect of software-defined CI processing calculates complex-valued subcarrier weights in order to synthesize and decompose a variety of different communication waveforms. In FIG. 1A, a transmitter is provided with a weight vector (such as any of a plurality of weight vectors 101 to 106) selected to generate a predetermined communication waveform. The weight vector is generated from CI codes that map waveform characteristics (e.g., packet length, bandwidth, modulation scheme, etc.) to spectral coefficients. The weight vectors 101 to 106 may be generated and/or stored in memory. CI coding also spreads a data symbol vector 110 onto the spectral coefficients. The resulting sub-carrier weights are input to the bins of an IDFT or IFFT 115 and then up-converted to the appropriate RF channel.

Figure 1B:
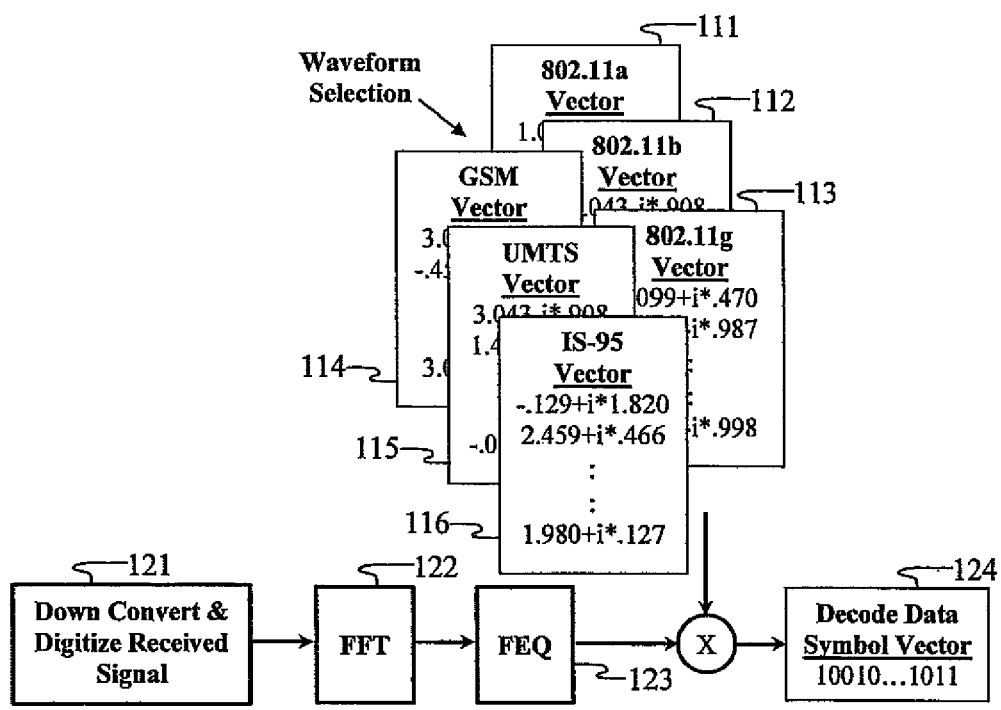
FIG. 1B illustrates a software-defined receiver that employs a CI decoder.

A receiver employs a complex conjugate of the appropriate communication waveform, as shown in FIG. 1B. A received signal is digitized and down converted 121 before being processed in a DFT or FFT 122. The resulting spectral components are frequency-domain equalized 123 and vector multiplied by an appropriate waveform-selection vector 111 to 116 to extract the coded data symbols. Decoding 124 produces estimates of the transmitted data.

In a software-adaptable transceiver module, a CI vector generator produces a sub-carrier weight vector corresponding to a particular waveform. When the vector weights are applied to input bins of an inverse Fourier transform, the resulting weighted spectral components (i.e., sinusoidal waveforms) combine to produce the corresponding waveform. Different sub-carrier weight vectors can produce waveforms corresponding to different cellular communication standards (such as GSM, IS-95, and UMTS) and different networking protocols (such as Bluetooth and 802.11a, b, and g).

In addition to synthesizing and processing conventional waveforms, new sub-carrier weight vectors can be developed to produce future waveforms. This simplifies system upgrades. In order to introduce a new waveform, a new vector can be added. Thus, CI is also adaptable to 3G waveforms, such as MC-CDMA, Spread-OFDM, coherence multiplexing, and UWB.

Figure 2:
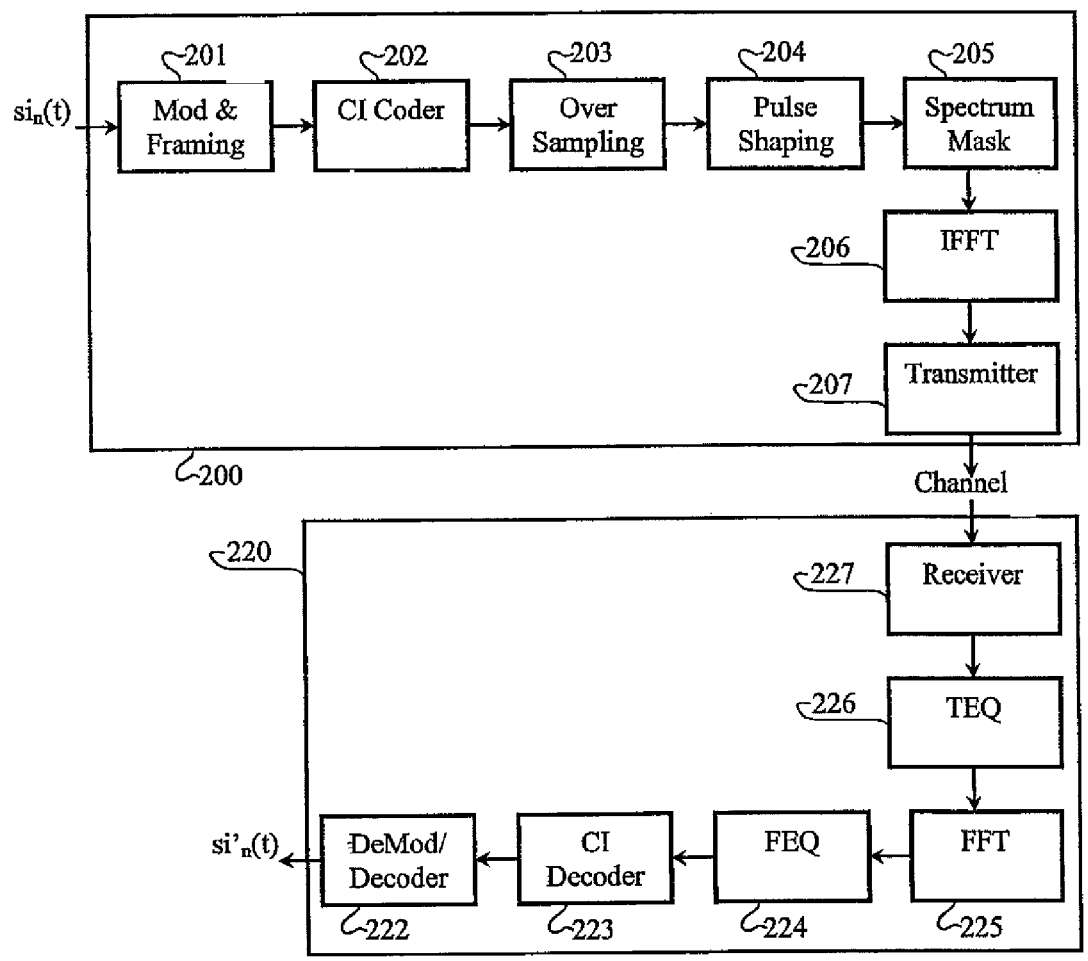
FIG. 2 illustrates a CI transmitter and a CI receiver.

FIG. 2 illustrates a CI transmitter 200 and a CI receiver 220 that may be adapted for use in a communications network, such as a mobile cellular network or a wireless local area network. Such communication systems consist of a downlink and an uplink. The downlink is typically a unidirectional communication link from a single base station to one or more remote, and possibly mobile, transceivers. The uplink is typically a unidirectional communication link from these transceivers to the base station. Typically, the downlink and uplink employ frequency division duplex (FDD) operation in which they occupy distinct non-overlapping frequency bands.

It is also possible to operate in a time division duplex (TDD) mode in which the uplink and downlink occupy the same frequency band but alternate in time. TDD is generally preferred only in systems having small multipath delay spreads. The uplink is a multiple-access channel, since multiple remote transceivers can access and share the uplink channel resources. The downlink can be regarded as a broadcast or multicast link. In general, the problem of interference suppression is more difficult and also more critical for the uplink, since it typically represents the capacity bottleneck compared to the downlink. Accordingly, various aspects of the invention are directed toward mitigating interference in CI systems.

The CI transmitter 200 includes a modulation and framing logic 201, a CI Coder 202, an optional over-sampling logic 203, an optional pulse-shaping filter 204, an optional spectrum mask 205, an inverse Fast Fourier Transform (IFFT) 206, and a transmission module 207. An optional framing and overlapping logic (not shown) may be coupled to the output of the IFFT 206. The CI transmitter 200 may be adapted to accept a spectrum-control instruction to generate the desired spectrum of the output signal. In one aspect of the invention, each of a plurality of CI transmitters is synchronized to a reference where the reference is derived from a common source.

The input data is sent to the modulation and framing logic 201. This block modulates the binary input data to generate real or complex-valued data, typically referred to in the art as "constellations". The modulated data are framed in blocks of size N. The modulation and framing logic 201 and/or the CI Coder may also include Hermitian extension logic for baseband applications. The Hermitian extension logic adds N/2 conjugate mirror samples to N/2 modulated data samples and forms a data frame of length N. The Hermitian extension is provided for baseband transmission applications in which the output of the IFFT 206 needs to be real-valued.

The modulation of the binary input data can be of many types. For example, the modulation can be phase shift keying (PSK), amplitude shift keying (ASK), quadrature amplitude modulation (QAM) or other derivatives of these modulation schemes, such as binary phase shift keying (BPSK), quadrature phase shift keying (QPSK) and 64-QAM. The particular type of modulation applied to the binary input data is not critical to the invention.

The CI coder 202 is adapted to encode the data symbols with CI codes that spread the data over predetermined sub-carriers (e.g., selected by frequency and number of subcarriers). The spreading is typically performed relative to channel conditions on each carrier or on an aggregate of carriers. Each of the subsets of CI sub-carriers may be modulated with respect to channel conditions of the corresponding subset. For example, higher modulation constellations may be employed for subsets characterized by better channel conditions. CI coding may include any combination of coding, including spread-spectrum coding, multiple-access coding, channel coding, and encryption. Other types of coding based on CI may be implemented.

After the binary input data has been modulated and framed in frames of length N, it may be input to the over sampling logic 203. The over sampling logic 203 inserts an integer number M−1 of logic zeros in between consecutive data samples. The purpose of the over sampling of the modulated data is to increase the frequency resolution of the data in order to allow better control of the spectrum of the CI signal generated by the transmitter 200. This forms a newly created frame of length MN.

If the CI transmitter 200 does not provide for over sampling, the frequency resolution of the transmitted CI signal is proportional to the given bandwidth divided by the frame length N. With over sampling, the frequency resolution is proportional to the given bandwidth divided by the frame length MN, which is a factor of M greater. The greater frequency resolution allows better precision in controlling the spectrum of the output signal.

The over-sampled data is coupled into an optional pulse-shaping filter 204. The pulse-shaping filter 204 performs spectrum shaping of one or more sub-carrier components of the output CI signal. The pulse-shaping filter 204 typically shapes the weights that are input to the bins of the IFFT 206. Other types of Fourier transforms may be used. For example, an IDFT or an I-OFFT may be employed. Other types of invertible transforms may be employed as appropriate for the output signal form, which depends on how a subcarrier is defined. Accordingly, various types of sub-carrier generators may be employed in place of the IFFT 206. Various types of subcarriers and corresponding CI processing relating to wireless communications are described in U.S. patent application Ser. No. 11/424,176, entitled "Method and Apparatus for Using Multicarrier Interferometry to Enhance Optical Fiber Communications," filed on Nov. 2, 1999, and incorporated by reference herein.

Subcarriers, or subchannels, may include any combination of diversity parameters. For example, each subcarrier may include one or more multi-frequency components. Each old set of subcarriers may include equal and/or different numbers of multi-carrier components (e.g., carrier frequencies). A set of subcarriers may include a plurality of contiguous carrier frequencies and/or non-contiguous carrier frequencies. A set of subcarriers may include equally spaced and/or unequally spaced carrier frequencies. Each subcarrier may be characterized by one of a plurality of carrier bandwidths. Similarly, any combination of carrier frequencies and at least one other diversity parameter may be implemented as a subcarrier. Each subcarrier may be defined by a space-frequency combination.

A spectrum mask 205 may be used to suppress one or more subcarriers and/or sub-carrier sidelobes. The spectrum mask 205 may be adapted to perform sub-carrier allocations to one or more users and/or one or more data sub-channels assigned to a user.

The pulse-shaping filter 204 may be used to suppress side lobes associated with predetermined subcarriers of the output CI signal. This pulse shaping can introduce known patterns of 181 that compromise orthogonality between the subcarriers. However, a receiver may utilize equalization, interference cancellation, and/or multi-user detection to mitigate ISI and loss of orthogonality.

A guard-interval module (not shown) may optionally be included in the transmitter 200. A guard interval unit is adapted to prepend a guard interval, such as a cyclic prefix, to each subcarrier or one or more groups of subcarriers. The requirement for cyclic redundancy to mitigate data corruption caused by multipath may be obviated provided that the length of a transmitted training sequence (or pilot tone) is sufficiently long relative to the channel delay spread. In some cases, a training sequence may be provided that contains a sufficient number of chips relative to the channel delay spread. The length of the training sequence may be determined by the prevailing dispersion conditions associated with the channel.

A guard interval, such as a time-domain redundant cyclic prefix, is typically inserted between transmitted symbols after inverse Fourier transform processing. In order to simplify frequency-domain equalization, the guard-interval length may be selected such that it exceeds the FIR channel memory. A guard interval may be implemented by padding trailing zeros (i.e., a null signal) to the end of each transmitted symbol, such as described in B. Muquet et al., "OFDM with Trailing Zeros Versus OFDM with Cyclic Prefix: Links, Comparisons and Application to the HiperLAN/2 System," IEEE International Conf. on Communications, New Orleans, La., Jun. 18-22, 2000, pp. 1049-1053, which is incorporated herein in its entirety.

Various data-detection algorithms may be employed in a CI receiver if a guard interval is not inserted after every symbol, or if it is omitted completely. Such techniques may approximate exact frequency-domain equalization, which eliminates the need for guard intervals. A computationally efficient interference cancellation may be performed. Accordingly, C. V. Sinn, J. Götze, M. Haardt: "Efficient Data Detection Algorithms in Single- and Multi-Carrier Systems Without the Necessity of a Guard Period", ICASSP 2002, Orlando, 2000, pp. 111-2737 to III-2740, is incorporated by reference.

Each transmitter may optionally include separate scrambling, interleaving, bit loading, tone ordering, and constellation encoding. In some applications, specific bit loading or tone ordering can be performed relative to different information types such that subcarriers are selected for optimal bit rates and error rates.

The transmitter 207 is adapted to process one or more baseband or IF signals for coupling into a communication channel. The transmitter 207 may include various transmission modules and functionality as is well known in the art for providing transmission from one or more antenna elements, The output time-domain signal from the IFFT 206 is typically converted into a time-domain analog signal by a conventional digital-to-analog converter (DAC). The modulated signals may be generated and transmitted (and/or received) in a manner to provide antenna, frequency, and/or temporal diversity.

If co-channel interference is localized in frequency, the affected bin (or bins) having an average signal-to interference-plus-noise ratio (SINR) below a certain threshold can be left unused. If the interference is temporary, the bin can be reused when the SNR improves. This procedure is well known in digital subscriber line modems that use DMT as the modulation scheme. This procedure may be implemented in a wireless multi-carrier system by measuring co-channel interference across the frequency band of interest. Furthermore, fading causes fluctuations in the channel frequency response with respect to time. Thus, carriers experiencing deep fades may be avoided.

Allocation of frequency bins (i.e., determining the spectral locations or bin numbers) to different users may be performed by taking spatial and other information (such as automatic gain control (AGC) information) into account. Each user may require one or more bins to meet a certain quality of service requirement. This aspect of the invention is particularly appropriate to adaptive-array architectures. However, it is not limited to such receiver configurations, as will be apparent to those skilled in the art.

The bins allocated to any one user (or any one data stream corresponding to a subset of a user's subcarriers) may be spaced far apart in frequency to minimize mutual inter-bin interference and enhance frequency diversity. The allocation of frequency bins to users and data sub-channels in multi-antenna systems is of particular importance. Each bin may be placed in a spectral location with bins belonging to other users that are spaced as far apart as possible in the dominant directions of arrival (DOAs) of their signals. Each bin may be placed in a spectral location with bins belonging to other users such that differences in signal strength of active bins in the neighborhood are minimized.

Each bin may be placed in a spectral location such that there are no co-channel interferers in the same frequency bands. If no such locations are available, spectral locations can be chosen based on the DOA and signal strength of co-channel interference. In general, co-channel interference bins with lower signal strength are assigned before bins with higher interference signal strength. Also, bins are preferably allocated so that the difference in the DOA's of the particular user and the interference are as large as possible. These criteria are balanced depending upon the operating environment. These criteria may be weighted to construct algorithms or flowcharts optimized for specific channel conditions and interference scenarios, as will be apparent to those skilled in the art.

Sub-channel allocation and control may be implemented with a status table for each bin. The table may include information, such as whether each bin is active or inactive at a given time, which user is assigned to the bin, type of data, modulation scheme and constellation size of symbols in the bin, received power level, dominant DOA's of the user occupying the bin, power level and DOA's of any co-channel interferers spectrally overlapping with the bin, etc. Note that all items of the above information may not be available or be able to be computed for each bin at all times. Some of the status items (such as received power levels) may be updated periodically. Other items may be updated via an event-driven mode, such as user activity and network control functions.

CI-based signaling can provide high spectral efficiency to all types of transmission protocols. In the frequency domain, the subcarriers are often overlapping and orthogonal. In conventional single-carrier protocols implemented with CI, the spectral roll-off at the band edges is shaped with respect to the long symbol period of the CI symbols, which is typically much longer than the symbol period of a conventional single-carrier signal. Therefore, the roll off is much steeper in CI signaling than it is for conventional single-carrier signaling. Unlike all other multi-carrier protocols, CI provides a low PAPR because the superposition of CI sub-carriers resembles a single-carrier signal.

Figure 3A:
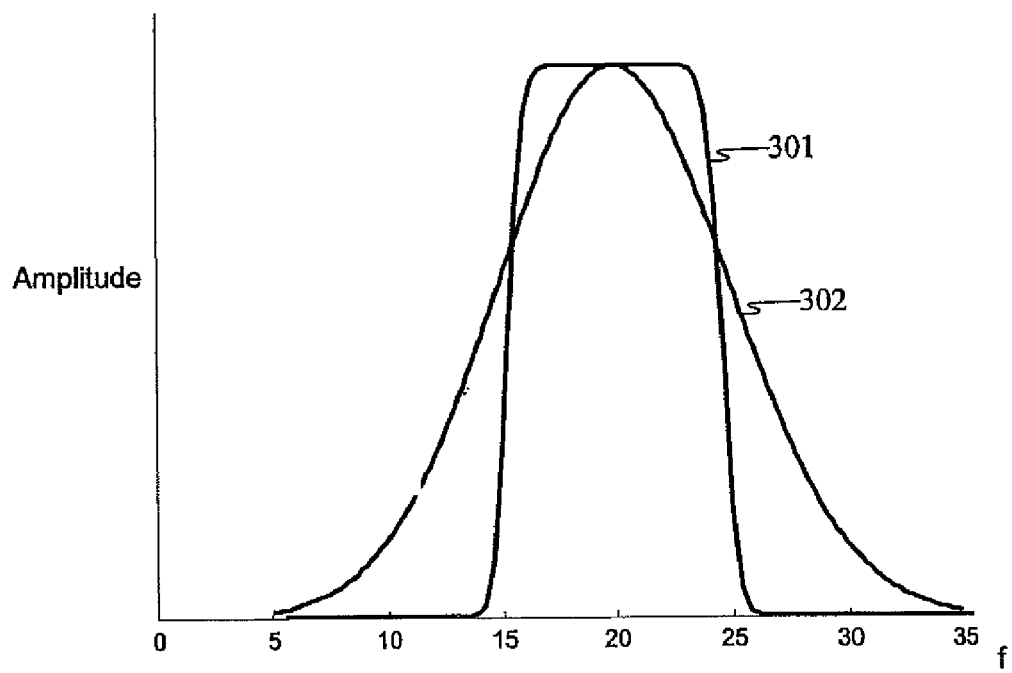
FIG. 3A is a plot showing the steep spectral roll-off of a basic CI pulse.
Figure 3B:
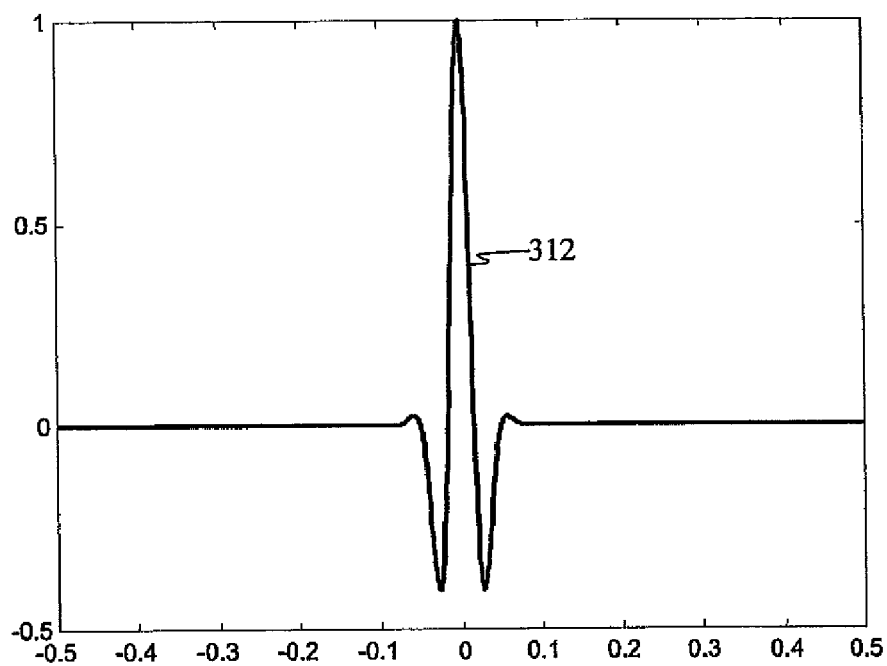
FIG. 3B shows the spectral response of a Gaussian-shaped pulse.

FIG. 3A illustrates a nearly rectangular spectral response 301 of a CI pulse 311 (shown in FIG. 3D) having ten subcarriers (modulated with random data) compared to the spectral response 302 of a Gaussian-shaped pulse 312 (shown in FIG. 3B) having the same pulse width as the CI pulse 311. The CI pulse 311 and the Gaussian pulse 312 are characterized by a frequency offset (e.g., an IF or carrier frequency) $f_o$ of 20, wherein the units of frequency are shown in normalized, generic form (and may be shifted to a desired frequency band.

The relationship between the CI and Gaussian waveforms in both the time domain and the frequency domain characterize trade offs that can be made between PAPR and data-bearing capability (i.e., BER, spectral efficiency, etc.). The CI pulse 311 has higher sidelobes in the time domain than the Gaussian pulse, which contributes to higher PAPR. The CI spectral profile 301 has a steeper roll off (and thus, better spectral efficiency) compared to the Gaussian spectral profile 302.

Figure 3C:
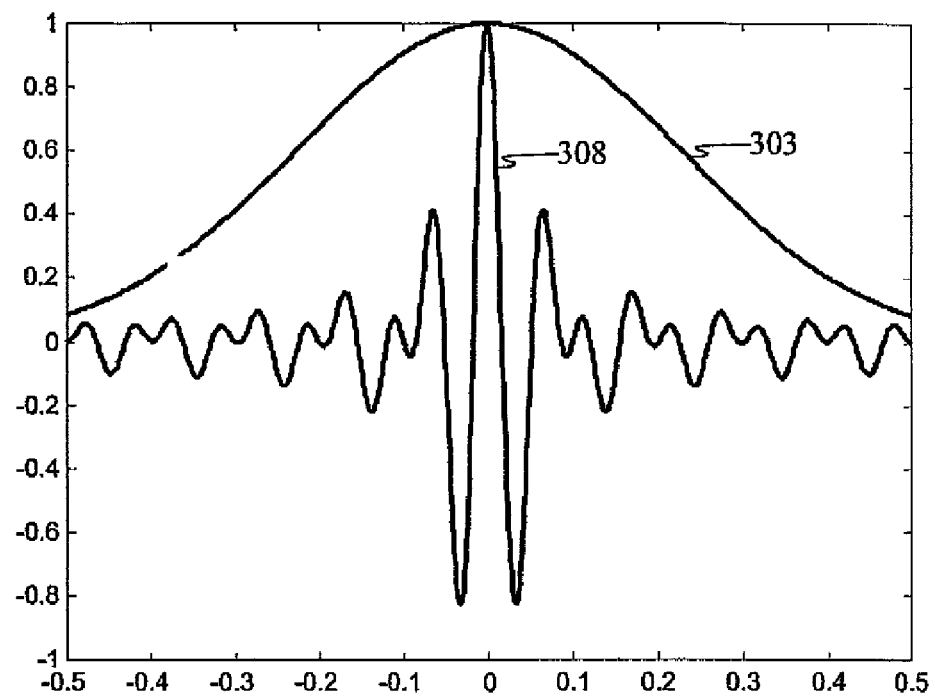
FIG. 3C illustrates a Gaussian-shaped window applied to a basic CI pulse waveform.
Figure 3D:
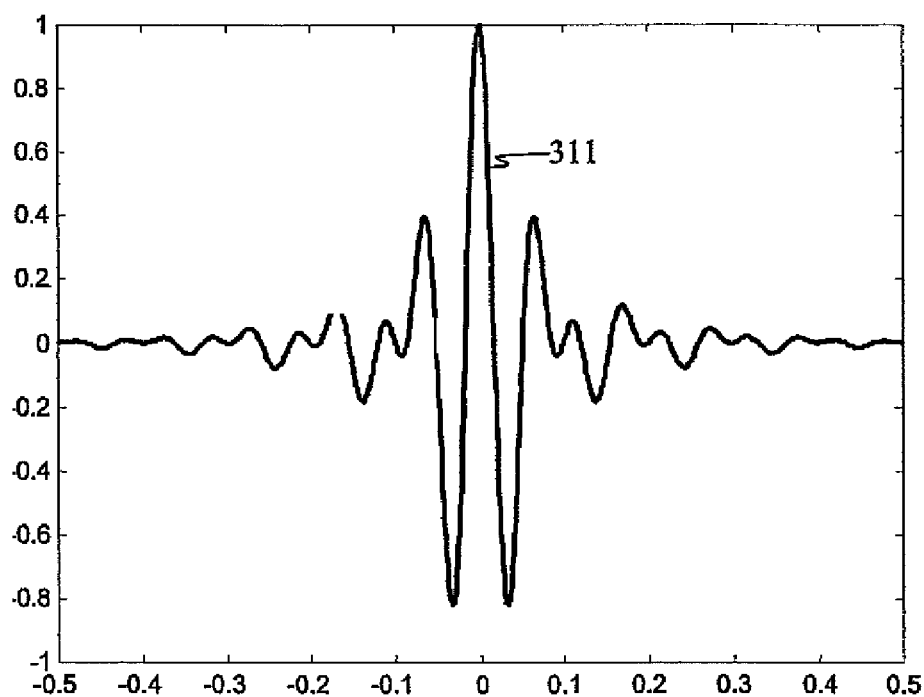
FIG. 3D is a time-domain plot of a windowed CI pulse.

FIG. 3C illustrates a Gaussian-shaped window 303 applied to a basic CI pulse waveform 308 over a symbol duration T that produces the CI pulse 311 shown in FIG. 3D. In contrast, the Gaussian pulse 312 has a symbol duration of $T_s/N$, where N=10. The CI pulse waveform 308 has a spectrum consisting of 10 equally spaced narrowband subcarriers. The window 303 is characterized by a spectral bandwidth that is inversely proportional to its duration. If the subcarriers are contiguously (and equally) spaced with respect to the inverse of the symbol duration $T_s$, the window spectrum convolved with the CI pulse spectrum reduces the roll off of spectral response 301 while flattening the CI pulse 311 sidelobes. Similarly, frequency-domain shaping of the CI sub-carrier spectrum may be performed, as is well known in the art. Alternative embodiments of the invention may employ different window shapes than shown in the drawings and described herein.

Various arrangements of CI sub-carriers are possible, such as non-contiguous and unequally spaced sub-carrier sets. Equivalently, different symbol periods $T_s$ relative to sub-carrier spacing(s) may be provided. In some aspects of the invention, different subcarriers and/or sub-carrier sets may be provided with different symbol durations. The spectrum of the resulting signal will vary accordingly. However, the spectral-efficiency advantages of CI are typically preserved. For example, when subcarriers of a particular channel or sub-channel are interleaved with other subcarriers, the sub-carrier spacing may be arranged such that multiple channels or sub-channels are orthogonal to each other, even if their sub-carrier spectra overlap.

It is well known in the art to apply windowing to smooth the transitions between adjacent data symbols, and thus, increase the spectral roll off. The following cyclic prefix shaping technique is well known and described in Chapter 2 of R. Van Nee and R. Prasad (*OFDM for Wireless Multimedia Communications*, Norwood, Mass.; Artech House, 2000, pp. 33-52). A cyclic prefix and postfix are added to each symbol. The resulting extended symbol is typically windowed using a Nyquist window (or some other common window) wherein the roll off is selected such that all of the prefix and postfix are windowed, but the original symbol is left unchanged. Adjacent symbols are then overlapped so that the windowed cyclic prefix of a particular symbol is added to the windowed cyclic postfix of the preceding symbol.

In F. Giannetti, "OFDM Communications Primer", Intellon Corporation, White Paper #0032, March 1999, which is incorporated by reference, the cyclic prefix and postfix are shaped using a raised-cosine window to provide smooth transitions at the band edges in the time domain, which increases the slope of the spectral band edges.

Figure 4:
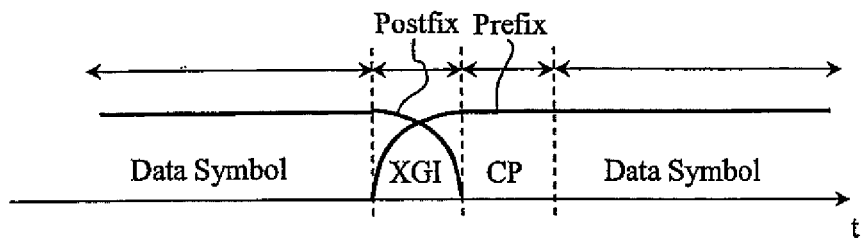
FIG. 4 illustrates overlapping guard intervals that may be employed in a CI signal.

FIG. 4 illustrates overlapping guard intervals (such as shown in J. M. Paez-Borrallo, "Multicarrier vs. Monocarrier Modulation Techniques: An Introduction to OFDM", BWRC Retreat—Winter 2000, Berkeley Wireless Research Center, Berkeley, Calif., Jan. 9-11, 2000, which is incorporated by reference) that may be applied to CI signals. In this case, an extra guard time XGI includes an overlap of a postfix and an extended cyclic prefix CP. Signals in the extra guard time are shaped to smooth transitions between each symbol and the following cyclic prefix. This helps to minimize adjacent channel interference.

A guard interval may be added to a superposition of CI subcarriers. Alternatively, a guard interval may be provided to each of a plurality of superposition signals produced from subsets of CI subcarriers corresponding to one or more users. In some cases, a guard interval or cyclic prefix may be generated and applied to each individual subcarrier, as is well known in the art and described in A. Czylwik, "Comparison between adaptive OFDM and single carrier modulation with frequency domain equalization", *IEEE Vehicular Technology Conference*, pp. 865-869, Phoenix, Ariz., May 1997, and J. Tubbax, et al., "OFDM versus Single Carrier with Cyclic Prefix: a system-based comparison," Proc. of IEEE Vehicular Technology Conference Fall, Vol. 2, pp. 1115-1119, October 2001, which are hereby incorporated by reference.

The present invention may employ Offset Quadrature Phase Shift Key (OQPSK) modulation, which is well known in the art. Various types of modulation may be applied to either or both the individual subcarriers and one or more sub-carrier superpositions. In OQPSK, an odd bit stream is delayed (typically by half a bit) with respect to an even bit stream. Minimum Shift Key (MSK) is derived from OQPSK by providing a tapered (e.g., a half-cycle sinusoidal) pulse. An MSK signal is defined as:

$$S(t)=d(t)[W_I(t)\cos(2\pi ft)+W_Q(t)\sin(2\pi ft)]$$

where $W_I(t)$ and $W_Q(t)$ are in-phase and quadrature-phase windows. MSK modulation provides a linear phase change and limited to a predetermined phase shift. Various forms of continuous phase modulation may be employed in the invention. In Gaussian Minimum Shift Key (GMSK) modulation, a Gaussian-shaped impulse response filter generates the window functions $W_I(t)$ and $W_Q(t)$. GMSK may be employed via FSK or QPSK modulation. Combinations of FSK and QPSK may also be used.

Modulations used in the present invention may include variations and combinations of modulation schemes mentioned in the following publications, which are incorporated by reference in their entirety: "Electromagnetic compatibility aspects of radio-based mobile telecommunication systems (DTI Link report, 1999)", Produced in 1999 for the LINK Personal Communications Programme by ERA Technology Ltd, Leatherhead, Surrey, KT22 7SA, England, "Practical GMSK Data Transmission", MX Com, Inc., Application note 1998, reprinted from *Wireless Design and Development*, January 1995, Vol. 3, No. 1, H. Zou et. al., "Equalized GMSK, Equalized QPSK and OFDM, a Comparative Study for High-Speed Wireless Indoor Data Communications", J. Vankka, "A multicarrier GMSK Modulator", *IEEE J. Sel. Areas in Comm.*, Vol. 19, No. 6, June 2001, and J. Vankka et. al., "A Multicarrier GMSK Modulator for Base Station", ISSCC 2001, Session 22, Technology Directions: System on a Chip/22.7.

In one aspect of the invention, MSK modulation is employed for sub-carrier symbol and/or data symbols modulated onto sub-carrier superpositions. The symbols preferably have symbol durations $T_d$ greater than the duration $T_s$ required for orthogonality so as to provide a guard interval. Continuous frequency variation of a guard-interval waveform is provided as needed within each guard interval to match the phase of each corresponding adjacent symbol waveform. Continuous amplitude variation is provided to a guard-interval waveform as needed within each guard interval to provide a smooth transition between the amplitudes of the corresponding adjacent symbol waveforms. In the case wherein digital implementations of the symbol and guard-interval waveforms are provided, the guard-interval waveforms are constructed to approximate either or both the continuous frequency variation and the continuous amplitude variation.

Each channel data stream, each sub-channel, each antenna, or some other unit of transmission can be modulated with a particular modulation scheme, such as selected from a set that includes M-PSK and M-QAM. Channel coding can be provided to each channel data stream, each sub-channel, each antenna, etc. Pre-conditioning of the data may also be performed at the transmitter unit using channel state information that is descriptive of the characteristics of the communications links. Such state information may include, for example, carrier to interference ratios or eigenmodes corresponding to the communications links.

Each subcarrier is phase and/or amplitude modulated, typically via Phase Shift Key (PSK) or Quadrature Amplitude Modulation (QAM), in which each symbol value is represented by a point in the complex plane. The number of available symbol values depends on the number of bits in each symbol. During initialization of a communications session, the number of bits per symbol (i.e., bit loading) for each subcarrier or predetermined group of subcarriers may be determined according to the quality of the corresponding transmission channel. In the case where CI-coded sets of CI sub-carriers are generated, bit loading on each sub-carrier set corresponds to the channel quality corresponding to the set. Thus, different sets may be provided with different data-symbol constellations. Similarly, sub-carrier allocations for each set may depend on given channel conditions, as well as other considerations, such as data rate. Sub-carrier allocations may vary with respect to sub-carrier sets. For example, sub-carrier sets may have different numbers of subcarriers, different sub-carrier frequency spacings, different sub-space profiles (e.g., transmitted by different groups of antennas), as well as other sub-carrier signal characteristics.

The channel quality is typically affected by frequency-dependent attenuation (e.g., multipath fading, scattering, absorption, path loss, etc.) and/or interference (e.g., co-channel interference, inter-symbol interference, multiple-access interference, etc.). Various types of signal distortion may occur in non-linear channels. Channel quality is typically measured as SNR, SNIR, BER, Packet Error Rate, Probability of error, etc. High-quality subchannels may be used to communicate data with a relatively dense QAM constellation, whereas low-quality channels may be limited to smaller constellations that allow a greater distance between adjacent points in the constellation. Some allocated subchannels may not be loaded with any bits due to attenuation and/or interference in those channels.

Multi-carrier modulation permits much of the data processing to be carried out digitally. Typically, the incoming bit stream is serially received and then arranged into data symbols. Reed-Solomon coding and other coding techniques are typically applied for error detection and correction. In CI, the coded data symbols are provided with polyphase coding that spreads each data symbol over multiple CI code symbols. Each CI code symbol is applied to each subcarrier.

In one embodiment of the invention, the data symbols are modulated onto a plurality of sub-carrier sets. Subcarriers in each sub-carrier set are provided with CI coding to minimize the PAPR of the composite, or superposition, signal. Other forms of PAPR reduction may be employed. For example, the unloaded subchannels may be used to transmit PAPR-reduction symbols. Similarly, unallocated and/or unused channels may be provided with PAPR-reduction symbols. The composite signals are amplified via power amplification prior to being combined.

Modulation of the subcarriers can be performed by applying a Fourier transform operation, such as an inverse Discrete Fourier Transform (IDFT), to the encoded symbols, producing an output modulated time-domain signal. The modulated signal is then serially transmitted. Much of the processing operations may be implemented on a single chip, such as a DSP, FPGA, or an ASIC.

The analog signals produced by the transmitter 200 shown in FIG. 2 are communicated over the channel to the receiver 220, which reverses the transmission process to recover the transmitted data. A communications channel may include any type of medium or mechanism for providing data from a transmitter to a receiver. The non-ideal impulse response of the transmission channel distorts the transmitted signal. Accordingly, the signal received by the receiving modem is a convolution of the analog transmit waveform with the impulse response of the channel. Ideally, the received sub-channels are orthogonal such that the modulated data can be retrieved via Fourier transform (e.g., a DFT or FFT) demodulation or some other invertible transform characterized by the appropriate orthogonal basis functions.

Signals coupled from the channel are processed in a receiver module 227. The signals are optionally filtered by an analog filter (not shown) in the receiver module 227. Filtering may be provided for anti-aliasing and/or to remove high-frequency noise from the received signal. Equalization of the analog signal may also be performed to compensate for attenuation in the transmission channel. An analog-to-digital conversion module (not shown) may be provided to convert the filtered analog signal into the digital domain. A digital filtering module (not shown) may be employed to augment the function of the analog filter (not shown).

A time domain equalizer (TEQ) 226 may optionally be provided. The TEQ 226 is preferably a finite impulse response (FIR) digital filter, which may be implemented as a software routine executed by a DSP. The TEQ 226 can be designed to effectively shorten the length of the impulse response of the transmission channel, including the filtering that is performed prior to receipt by TEQ 226. The design of a TEQ filter may include selecting FIR coefficients during initialization or training operations associated with establishing a communications session.

A guard-interval removal module (not shown) may precede an FFT 225. The complex frequency values produced by the FFT 225 are processed by a frequency domain equalizer FEQ 224. The FEQ 224 scales the values with an appropriate vector of complex numbers that ensures phase and power equalization of the received signal. The FEQ 224 vector may be adapted dynamically and/or set during an initialization process to compensate for phase distortion and power attenuation introduced by the channel. The equalized complex values are despread into data symbols by a CI decoder 223. Channel decoding (e.g., Reed-Solomon decoding and descrambling) in decoder 222 completes the receiver data processing. The resulting bits are streamed as appropriate for the application.

The baseband processing portion of the receiver may include a pilot-tracking loop (not shown). The loop may incorporate a phase error metric utilizing a maximum likelihood estimator for phase errors of the received data symbols.

Channel compensation, such as performed by the TEQ 226 and the FEQ 224, depends on an effective channel estimation algorithm. Channel estimation typically includes any technique used to characterize a time domain and/or frequency domain channel response. Pilot-based channel estimation typically tracks the amplitude and phase of at least one transmitted pilot tone. Similarly, training symbols may be transmitted preceding a data payload, following a payload, or interleaved into a payload.

Interpolation may be provided between adjacent channel estimates to track changing channel conditions. In some aspects of the invention, training symbols are placed in the header and trailer of each packet. Training symbols may even be placed in the data payload. Channel estimates are then interpolated over the interval between the training symbols. For example, channel estimates over a packet duration may be estimated by assuming a linear variation in the channel between two or more channel estimates. Estimated channel characteristics may be generated in intervals containing no training symbols by providing a linear interpolation function between the measured training symbols. Interpolation functions may be developed to more closely characterize a channel's rate of change. Other interpolation functions may be used to estimate channel variations.

Alternatively, blind or semi-blind algorithms may be employed for channel estimation. Accurate channel estimation is possible through the use of Wiener frequency domain MMSE deconvolution combined with frequency domain spatial decoupling matrices.

In a multi-carrier system, channel estimation typically involves determining channel impulse responses of a plurality of sub-carrier channels. For example, transform operations may be performed on both a training sequence received from the communications channel and a replica of the received sequence that is generated locally. In this case, the transform operations are arranged to generate a plurality of frequency bins corresponding to the received training signal and a plurality of frequency bins corresponding to the locally generated signal. The transform operations are followed by point-by-point operations between corresponding received signal frequency bins and local signal frequency bins. Concatenating the point-by-point operations associated with the channel provides a composite frequency response for the channel. This composite frequency response allows the generation of a time domain channel impulse response for the channel. Other types and variations of channel estimation may be performed.

The channel estimator may utilize the outputs of the FFT 225 to determine an initial coarse frequency estimate from short symbols of a preamble and a fine frequency estimate from long symbols of the preamble. This information is used to generate the coarse and fine frequency estimate signal, such as employed in a pilot-tracking loop. Alternatively, pilot tracking may occur before the FFT 225 operation such that the phase error for subsequent data symbols is reduced prior to processing by the FFT 225.

The step of equalizing includes a step selected from the group consisting of: performing a frequency domain equalization, performing a time-domain equalization, performing a decision feedback equalization, performing an iterative equalization, performing an ISI cancellation, performing a turbo equalization, and performing a maximum likelihood sequence estimation. Fractionally spaced equalization may be adapted to systems employing cyclic prefixes.

Coefficients for use in an equalizer filter are typically based on the noise covariance and channel impulse response of the corresponding communications channel. A channel impulse response is determined from the channel transfer function, and a noise covariance is based on the noise power spectral density. These channel characteristics are typically measured from known transmissions or calculated from received data.

Sub-space algorithms, such as semi-blind subspace-based channel estimation, have been shown to reduce variations in channel tracking. Equalization may be based on any known equalization scheme, such as overlap-and-add block convolution or overlap-and-save algorithms.

The communications receiver includes at least one of a time-domain equalizer and a frequency-domain equalizer. The receiver may further include an update mechanism configured to update the time-domain equalizer and/or the frequency-domain equalizer based upon measured or estimated performance of a communications link from which the receiver receives data.

An equalizer typically uses an algorithm with a set of coefficients that are selected based on noise power and an impulse response of the communications channel. An estimate of the original data is recovered by demodulating the equalized data. The coefficients are selected according to one or more particular approaches. For example, the coefficients may be selected to optimize the impulse response length of the communications channel to reduce interference, such as inter-symbol interference (ISI) and inter-channel interference (ISI), to reduce noise power, or to simultaneously optimize impulse response length and reduce noise power. As another example, the coefficients may be selected to reduce noise power due to ISI, ICI, and noise from additional interference sources, including, but not limited to, inter-cell interference, jamming, and/or other external sources of interference. As yet another example, the coefficients may be selected by minimizing a function of a channel's impulse response and noise power, or noise power spectral density.

An equalization technique may employ a Wiener least squares filter that utilizes a modified inverse filter to control the white noise response of the filter, i.e. the undesired enhancement of thermal noise from the antenna. In M. Haardt, "Smart Antennas for Third Generation Mobile Radio Systems", Sixth Annual Workshop on Smart Antennas in Wireless Communications, Stanford University, Palo Alto, Calif., July 1999, which is incorporated by reference, channel equalization is described in terms of a Wiener filtering response. Channel equalization in the context of the Wiener filter is presented in H. Sari et. al., "Transmission Techniques for Digital TV Broadcasting", *IEEE Communications Magazine*, Vol. 33, No. 2, pp. 100-109, February 1995, which is incorporated by reference.

Various types of multi-user detection may be employed in the present invention. These types include hard decision and soft decision multi-user detection techniques. Multi-user detection techniques described in the following publications are incorporated by reference: J. Blantz et. al., "Performance of a cellular hybrid C/TDMA mobile radio system applying joint detection and coherent receiver antenna diversity", IEEE J. Selected Areas in Comms. 12(4), May 1994, pp. 568-579 and A. Klein et al., "Zero forcing and minimum mean square error equalization for multiuser detection in code-division multiple access channels", IEEE Trans. Veh. Tech. 45(2), May 1996, pp. 276-287.

The length of the impulse response of the physical channel determines the required length of the guard interval. However, a long guard interval reduces the effective throughput of the transceiver. Thus, to avoid using a long guard interval, filters may be employed to shorten the channel impulse response and thereby allow the use of a shorter guard interval. Time domain linear filters, often referred to as shortening impulse response filters (SIRFs) or time-domain equalizers, are typically employed to shorten the channel impulse response.

A number of techniques have been proposed for designing TEQ filters. J. W. P. Melsa and R. C. Younce, "Impulse Response Shortening for Discrete Multitone Transceivers," IEEE Trans., COM-44, (12), 1662-1672 (1996); and N. Al-Dahir and J. M. Cioffi, "Stable Pole-Zero Modeling of Long FIR Filters With Application to the MMSE-DFE," IEEE Trans., COM-45, (5) 508-513 (1997), are incorporated by reference herein. Generally, these filter design algorithms are typically based on least mean square (LMS) or eigenvector calculus.

Filter coefficients for SIRF filters may be selected in order to satisfy constraints in both the time and frequency domains to improve performance. More specifically, SIRF filters may be adapted to shorten the channel impulse response in the time domain while also providing a frequency response that does not attenuate or amplify the received signal.

An SIRF filter satisfying both frequency and time constraints is obtained by determining the intersection of constraint sets that must be satisfied in both time and frequency domains. By varying the sets utilized to define the time and frequency domain constraints, SIRF filters having a linear or non-linear phase response may be obtained. A vector space projection method or equivalent iterative algorithm may be applied to the sets until the algorithm converges to a solution (i.e., either the intersection or a point with minimum summing distance to all sets). In the case of SIRF design, the solution of the algorithm provides the filter coefficients.

In one aspect of the invention, a function that may be performed during the training sequence on initiation of a communication session determines the number of bits per symbol (i.e., the bit loading) assigned to each subchannel. After bit loading, it is common for a number of subchannels (typically sub-channel frequencies experiencing deep fades or interference) to remain unloaded, carrying no data symbols at all. Similarly, there may be other unused channels, such as unallocated channels. The PAPR is reduced by using these unloaded subchannels to carry a PAPR-reduction signal that does not necessarily contain any data payload, but has the effect of reducing the amplitude of the time-domain signal below a predetermined PAPR threshold. Channels reserved for other purposes may be used for PAPR-reduction signaling. Channels may be allocated specifically to convey PAPR-reduction signals.

In one aspect of the invention, a PAPR-reduction circuit coupled to a carrier generation circuit in a transmitter is adapted to produce one or more PAPR-reduction signals. The PAPR-reduction signals are combined with the data-bearing subcarriers prior to amplification by one or more amplifier circuits. The amplified PAPR-reduction signals may optionally be filtered, or otherwise attenuated, prior to coupling into a communication channel. An optional attenuation module may be adapted to provide frequency-dependent attenuation to the amplified signals, such as to reduce or remove one or more amplified PAPR-reduction signals. The generated PAPR-reduction signals may be used to ensure low PAPR at either or both the transmit side and the receive side.

In another aspect of the invention, a PAPR-reduction circuit is coupled to a low-noise amplifier in a receiver. The PAPR-reduction circuit is adapted to lower the PAPR of a combined signal consisting of at least one received signal and at least one PAPR-reduction signal. The receiver's PAPR-reduction circuit may be adapted to generate one or more PAPR-reduction signals from any combination of one or more received PAPR-reduction signals transmitted by a remote transceiver, one or more pilot tones, one or more training signals, one or more control signals, and one or more data-bearing signals.

In another aspect of the invention, methods are provided that perform an iterative process to derive symbols for one or more unloaded subchannels. For example, an initial trial value (possibly zero) of the unloaded sub-channel signal is added to the time-domain signal generated by the IDFT. A non-linear function corresponding to the power amplifier is applied to the combined time-domain signal. If no clipping occurs (i.e., if none of the signal elements change), the current trial value of the unloaded sub-channel signal is kept as part of the signal. Alternatively, if the nonlinear amplifier function indicates clipping, the clipping is used to determine a new trial signal for the unloaded subchannels, and the process is repeated until clipping does not occur.

Figure 5A:
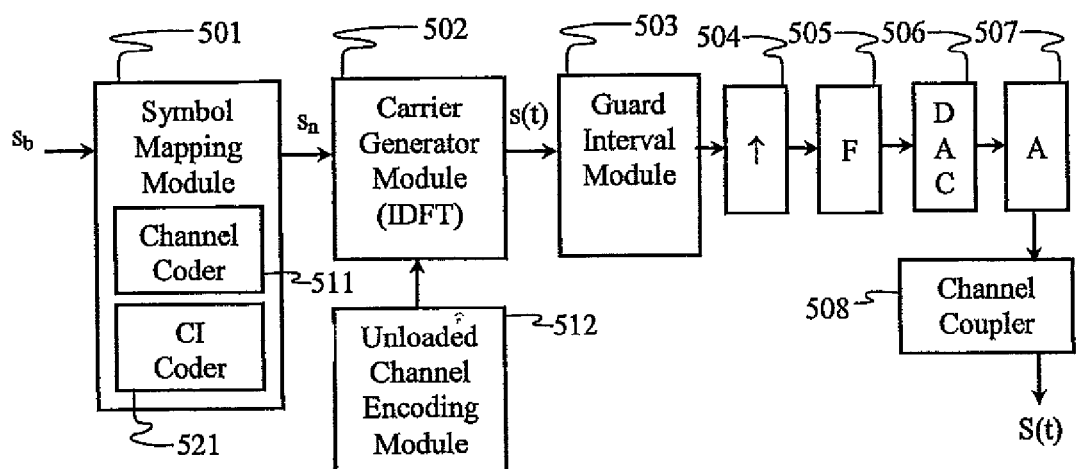
FIG. 5A illustrates a transmission method and system employing PAPR-reduction signaling of the present invention.

FIG. 5A illustrates a transmission method and system employing PAPR-reduction signaling of the present invention. A transmitting modem is provided with an input bit stream that is to be transmitted to at least one receiving modem over a wireless communication channel. The bit stream is coupled to a symbol-mapping module 501. The mapping module 501 groups the sets of input bits to multiple-bit symbols. The number of bits allocated to each subchannel may vary with respect to the corresponding bit loading determined in an initialization step. The symbols correspond to points in at least one modulation constellation (e.g., QAM, PSK, etc.).

The mapping module 501 may optionally include a channel coder 511 (e.g., an error-correction coder) adapted to provide coding for error detection and correction. The channel coder 511 may be adapted to perform any combination of various types of coding, such as Reed-Solomon coding, trellis coding, turbo coding, CI coding, and/or LDPC coding. The mapping module 501 preferably includes a CI coder 521 adapted to perform at least one predetermined combination of spreading and channel coding. The symbols generated by the mapping module 501 are typically complex symbols including both amplitude and phase information. The mapping module 501 is typically adapted to provide a serial-to-parallel operation on the symbols.

The encoded symbols are then applied to a carrier-generator module 502 (such as a system or module adapted to perform an IDFT or IFFT). The mapping module 501 may optionally apply a plurality of different sequences of a given data block to different subcarriers as part of a process for identifying a sequence that minimizes clipping or PAPR. The carrier-generator module 502 associates each input symbol with one of a predetermined set of subchannels, and generates a corresponding time-domain sequence. The carrier-generator module 502 is typically adapted to perform a parallel-to-serial operation for generating the time-domain sequence.

The carrier-generator module 502 converts the input digital bit stream into a serial sequence of symbol values corresponding to a superposition of the predetermined set of modulated sub-channel frequencies. The modulation is indicative of the various data values. Typically, N/2 unique complex symbols (and its N/2 conjugate symmetric symbols) in the frequency domain will be transformed by an IDFT function into a block of N real-valued time domain samples.

An optional guard-interval module 503 adds a guard interval (e.g., a cyclic prefix or a null signal) to each block of serial samples. A guard interval has the effect of limiting inter-symbol interference (ISI) due to energy from a previous symbol spreading into the next symbol due to the channel response. A cyclic prefix causes the data stream to appear to be periodic over a block of N of the N+P samples (where P is the length of the prefix) such that the equivalence between frequency-domain multiplication and time-domain convolution is valid.

An optional up-sampling module 504 and an optional digital filter 505 may process the digital data stream. Up sampling inserts zero-valued samples between each of the input signal samples to increase the sample rate by some predetermined multiple. The digital filter 505 may include a digital low-pass filter to remove image components and/or a digital high-pass filter to remove interference. The digitally filtered signal is then processed by a DAC 506, which produces an analog signal. An analog filter (not shown) may optionally filter the output analog signal. The analog signal is amplified by a power amplifier 507, which optionally performs a clipping function, such as a hard-limiting clipping function that limits the signal amplitude. The DAC 506, amplifier 507, and any analog filter may be implemented in a coder/decoder (codec) integrated circuit.

The amplified analog output is then coupled into a transmission channel by a channel coupler 508, such as one or more antenna elements. The coupler 508 may include transmit circuitry, as is typically provided in RF transmitters. In general, the receiving modem (not shown) reverses the processes performed by the transmitting modem to recover the input bit stream as the transmitted communication.

An unloaded channel-encoding module 512 generates symbols that are assigned to unloaded subchannels in order to reduce the likelihood of clipping. The symbols are generated and applied to reduce the PAIR of the transmitted signal. A clip-prevention signal can be generated that is orthogonal to the data-payload signal by allocating the clip-prevention signal to subchannels where the data-payload signal is zero. To reduce the peak amplitude of the data-payload signal after carrier generation (IDFT) and D/A conversion, the clip-prevention signal is adapted to maintain the data-payload signal below the clipping threshold. The clip-prevention signal may be applied before or after carrier generation.

A particular benefit of the methods of the invention is that the receiver need not transform the signal, and that little or no data rate is lost. The modifying signal applied by the transmitter only affects unloaded (e.g., deeply faded) subchannels, and is not detected or considered by the receiver when demodulating the transmitted signals on higher-quality subchannels.

When low-quality channels are sacrificed to provide for transmission of a clip-prevention signal, the total transmit power can be increased, thereby increasing the throughput (e.g., by enabling larger modulation constellations and/or reducing channel coding). The increased throughput typically more than offsets the loss due to sacrificing the low-quality channels.

In cases in which CI signaling is provided by the transmitter, unloaded subchannels may be combined to generate superposition signals for PAPR reduction, or clip prevention. The superposition signals may be used to reduce the amplitudes of constructive superpositions of information-bearing CI pulses. For example, the superposition signals may be used to reduce peaks resulting from superpositions of CI pulse sidelobes with other side lobes and/or CI pulse main lobes. Similarly, CI signaling may be provided on the unloaded subchannels, even when other types of multi-carrier modulation are used. The CI-pulse waveforms provide for a low-complexity solution to canceling peaks generated by other multicarrier transmission protocols.

Figure 5B:
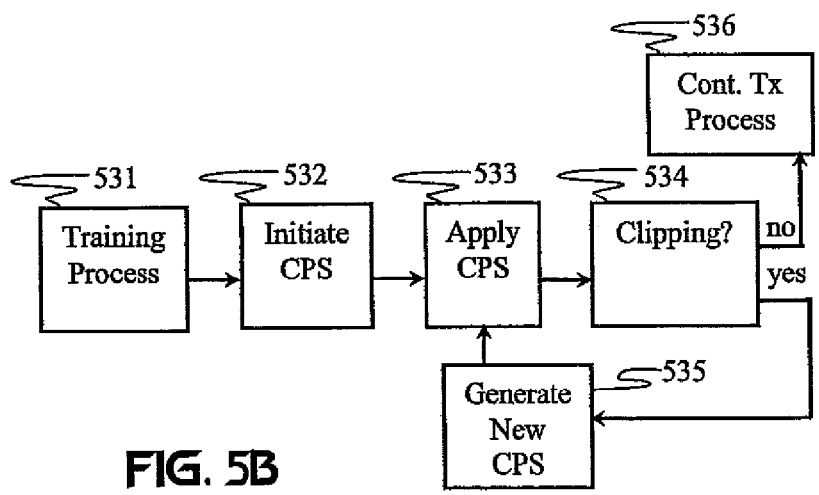
FIG. 5B illustrates a feedback approach for reducing PAPR below a predetermined threshold.

The present invention may be implemented via an iterative approach executed in a transmitter feedback loop, as illustrated in FIG. 5B. A training process 531 may optionally involve channel estimation to identify subcarriers characterized by poor channel quality (e.g., deep fades, interference, distortion, etc.). Channels that are unsuitable for data communications (or minimally suitable with respect to some predetermined quality-measurement threshold) may be allocated for transmission of one or more PAPR-reduction (e.g., clip-prevention) signals.

In a MIMO configuration, subcarriers may be identified with respect to unique space-frequency combinations. Thus, certain sub-space channels identified as unsuitable for data communications may be allocated for PAPR-reduction transmissions. Similarly, unallocated subchannels and/or allocated (but unused) subchannels may be identified for PAPR-reduction transmissions. In some cases, subchannels in a network (such as a MIMO, MISO, or SIMO network) may be allocated specifically for PAPR-reduction transmissions.

An initial trial value of an orthogonal clip prevention signal is selected in a clip-prevention initiation step 532. The initial value may be zero. The initial value may be retrieved from a look-up table, or it may be derived from an amplitude-profile estimation of the unaltered transmission signal. The clip-prevention signal is orthogonal to the data in that it is applied to orthogonal subchannels or subspaces.

In step 533, a time-domain signal is produced by performing an IDFT of the payload data signal and the trial value of the clip-prevention signal. A nonlinearity corresponding to the clipping threshold may be applied to the resulting superposition signal. The time-domain signal may be generated via CI processes.

In step 534, the resulting time-domain signal is examined to determine if any clipping has occurred (or will occur). If clipping occurs, a new estimate for the clip-prevention signal is generated 535. The new nonlinear clipping function is applied to the data. In some cases, the clip-prevention signal is applied to the IDFT with the data. The time-domain clip prevention signal may be combined with the time-domain signal generated from an IDFT of the data. If there is no clipping, the most recent trial value of the clip-prevention signal is maintained and is transmitted in the unloaded channels along with the DMT-modulated payload.

Different embodiments of the invention may be provided for mapping each of a plurality of data symbols to a plurality of subcarriers. Spreading may include any combination of signal-processing techniques that map a data symbol into a plurality of symbols, such as spread-spectrum coding, channel coding, redundancy, etc. Channel coding typically includes any of various combinations of block coding, convolutional coding, and parity check coding. Implementations of channel coding may provide for iterative processing, feedback techniques, and various types of decision processing, including hard and soft decision algorithms.

Although subcarriers shown herein are basic multi-frequency subcarriers, different types of channelization (including combinations of channelization techniques) may be employed. For example, subcarriers may be interleaved in time or frequency hopped. The subcarriers may employ space-time channels, space-frequency channels, code-space channels, and/or any other forms of sub-space channelization. Various coding techniques, as well as other signal-processing techniques, may be employed to provide for sub-space processing and related functionality, such as successive interference cancellation.

The inventive aspects (i.e., the functionality) of the methods and the system components illustrated and described throughout the specification may be provided by different combinations of steps and components (and in some cases, by entirely different steps and/or components). The illustrated and described embodiments herein are meant to merely convey the basic functionality of the invention.

Figure 6:
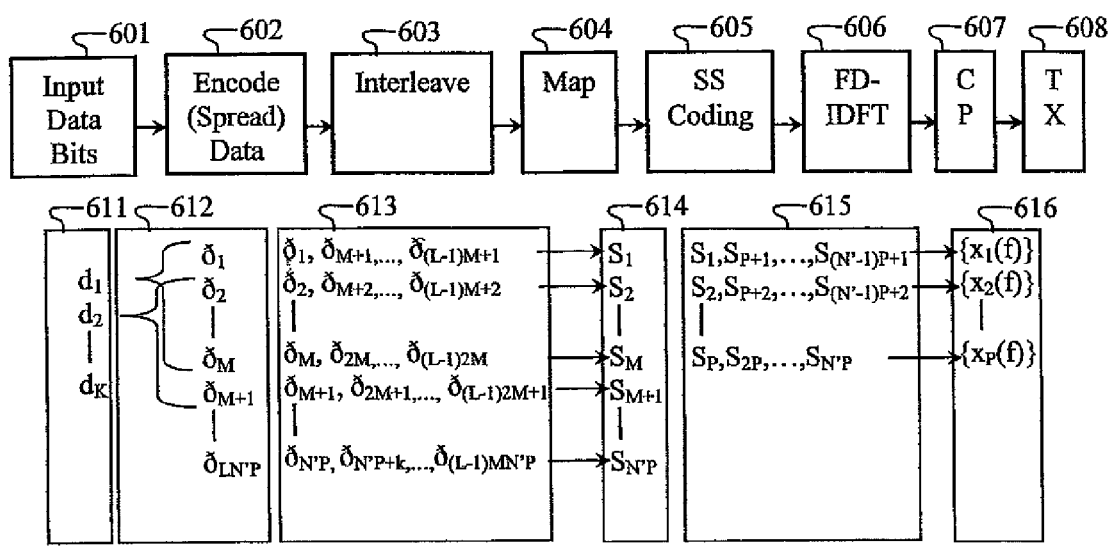
FIG. 6 illustrates a set of methods and components of the present invention.

FIG. 6 illustrates a set of methods and components of the present invention. A data input port 601 is provided for accepting a plurality K of data bits 611. A coding module 602 spreads the data bits 611 to produce a plurality of coded data bits 612 with M-fold spreading (i.e., each data bit $d_k$ is mapped to M coded data bits $\delta_m$. An interleaving module 603 and a mapping module 604 group the coded data bits into a plurality N'P of data-bit sets and maps each set into a plurality N'P of data symbols 614. A second coding module 605 spreads the data symbols into a second set of coded data symbols 615.

Each row of symbols shown in set 615 may be converted into one or more new coded data symbols. For example, a new coded data symbol corresponding to each row in set 615 may include a complex weight applied to a subcarrier. In another aspect of the invention, symbols in each row are mapped to a plurality of subcarriers via some combination of spreading and/or channel coding.

The coded data symbols are provided to a sub-carrier generator, such as an IDFT 606. The IDFT 606 shown in FIG. 6 is adapted to generate a plurality of communication waveforms, wherein each waveform is characterized by a different set of sub-carrier frequencies 616. Symbols in each row in set 615 are mapped (e.g., spread) onto the subcarriers of the waveform corresponding to that row.

Additional signal processing that is applicable to single carrier or multicarrier signaling may be performed. For example, a guard-interval module 607 may be provided to add a cyclic prefix to the individual subcarriers, to sub-carrier groups, and/or to the transmission consisting of a combined set of all of the subcarriers. A transmit module 608 is adapted to provide all digital and analog processing necessary to adapt the multicarrier signal for transmission into a communication channel. The transmit module 608 may provide for sub-space processing and related functionality, such as successive interference cancellation.

The inventive aspects (i.e., the functionality) of the methods and the system components illustrated and described throughout the specification may be provided by different combinations of steps and components (and in some cases, by entirely different steps and/or components). The illustrated and described embodiments herein are meant to merely convey the basic functionality of the invention.

FIG. 6 illustrates a set of methods and components of the present invention. A data input port 601 is provided for accepting a plurality K of data bits 611. A coding module 602 spreads the data bits 611 to produce a plurality of coded data bits 612 with M-fold spreading (i.e., each data bit $d_k$ is mapped to M coded data bits $\delta_m$. An interleaving module 603 and a mapping module 604 group the coded data bits into a plurality N'P of data-bit sets and maps each set into a plurality N'P of data symbols 614. A second coding module 605 spreads the data symbols into a second set of coded data symbols 615.

Each row of symbols shown in set 615 may be converted into one or more new coded data symbols. For example, a new coded data symbol corresponding to each row in set 615 may include a complex weight applied to a subcarrier. In another aspect of the invention, symbols in each row are mapped to a plurality of subcarriers via some combination of spreading and/or channel coding.

The coded data symbols are provided to a sub-carrier generator, such as an IDFT 606. The IDFT 606 shown in FIG. 6 is adapted to generate a plurality of communication waveforms, wherein each waveform is characterized by a different set of sub-carrier frequencies 616. Symbols in each row in set 615 are mapped (e.g., spread) onto the subcarriers of the waveform corresponding to that row.

Additional signal processing that is applicable to single carrier or multicarrier signaling may be performed. For example, a guard-interval module 607 may be provided to add a cyclic prefix to the individual subcarriers, to sub-carrier groups, and/or to the transmission consisting of a combined set of all of the subcarriers. A transmit module 608 is adapted to provide all digital and analog processing necessary to adapt the multicarrier signal for transmission into a communication channel. The transmit module 608 may provide power amplification, filtering, up conversion, DAC operations, as well as any other transmitter-related functions to individual subcarriers and/or groups of subcarriers.

Figure 7:
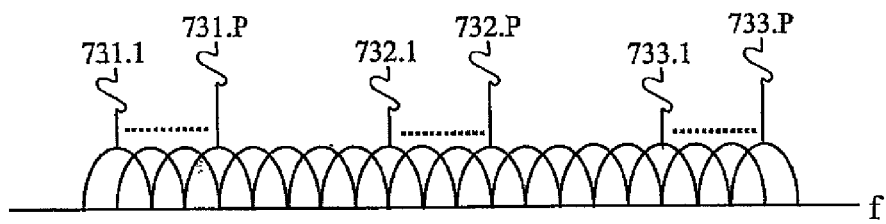
FIG. 7 shows sub-carrier frequencies allocated to individual users or data symbols.

FIG. 7 illustrates an exemplary spectral distribution of subcarriers employed in the invention. A first set of subcarriers 731.1 to 733.1 are allocated to a particular user. A number P−1 of additional sub-carrier sets, such as set 731.P to 733.P, are allocated to the same user. In one particular aspect of the invention, subcarriers allocated to a particular user are divided into a plurality P of sub-carrier sets (such as illustrated in FIG. 7) in order to convey symbols on different frequency division channels. This channelization technique can greatly simplify some of the transceiver operations, such as coding, decoding, multi-user detection, etc.

Improved frequency-division techniques employed in multi-carrier systems are described in. B. Natarajan et. al., "Introducing Novel FDD and FDM in MC-CDMA to Enhance Performance", Proceedings of *IEEE Radio and Wireless Conference* 2000 *RAWCON'00*), pp. 29-32, Denver, Colo., Sep. 10-13, 2000 and PCT Appl. No. PCT/US99/02838, which are incorporated by reference.

Subcarriers allocated to a particular user may include contiguous or noncontiguous sets of subcarriers. Each set of subcarriers preferably spans a wide frequency band such that if there are N' subcarriers in each set, there can be up to N'-fold frequency diversity. However, since the number N' of subcarriers in each set is a fraction of the total number of subcarriers N=N'P allocated to a user, a loss of a subcarrier (e.g., due to a deep fade or interference) substantially distorts the signals in the corresponding set. Loss of several subcarriers in a set can result complete loss of the data in that set. Thus, the spreading aspect of the invention, such as illustrated in FIG. 6, can provide the performance benefits of spreading each data bit over a large number of subcarriers to the reduced complexity of processing small sub-carrier sets.

In FIG. 6, N=N'P sub-carriers are allocated to a particular user in which there are P coded sub-carrier sets of N' subcarriers each. The mapping module 604 maps L bits into each symbol to generate N'P symbols per map set. The coder 605 may optionally introduce some redundancy into the transmission. Any combination of the interleaver 603, mapping module 604, and coder 605 may be integrated into a single module. The interleaver 603 simply groups the input coded bits δ into N'P groups such that the mapping module 604 effectively maps each data bit $d_k$ to a different symbol $S_p$. Alternatively, a smaller or larger number R (relative to N'P) of symbols $S_p$ may be generated. The coding step 605 may then be adapted to convert the R input symbols $S_p$, to N'P output symbols. Similarly, other combinations of the modules shown in FIG. A2A may be consolidated. For example, the coder 602, interleaver 603, and mapping module 604 may be integrated into a single module. In some cases, the function of one or more of the components and/or steps of the invention (and its various embodiments and aspects) may be performed by different components and/or algorithms.

The first coder 602 has a spreading factor of M. A group of K input data bits $d_k$ are mapped by the coder 602 to at least one set of LN'P coded data bits $\delta_m$. Each input data bit $d_1$ is mapped to M coded data bits $\delta_m$. Each coded data bit $\delta_m$ conveys information about one or more of the input bits $d_k$. In this case, bit $\delta_1$ in the coded data bits 612 corresponds to bit $d_1$ and any M−1 previous bits. Similarly, $\delta_2$ corresponds to bits $d_1$ and $d_2$ and any M−2 previous bits. In one aspect of the invention, the last M−1 data bits of each set of K data bits may be prepended to the set for coding purposes. This technique is particularly useful for providing "earlier" bits relative to the beginning of a data stream when generating a convolutional code. Alternatively, the process of prepending a cyclic prefix may begin with cyclically prepending bits to the input data bits 611 to generate a larger set of coded data symbols 612 and 613. Cyclic prefixes applied to each subcarrier or each sub-channel (a group of subcarriers) may correspond to signals that are functions of a predetermined number of the leading symbols, such as shown in the serial symbol groupings 613 or 615. Typically, each cyclic prefix is a digital or analog waveform conveying the prepended bits and optionally, provided with a smoothing function (e.g., MSK modulation) to smooth any discontinuities between adjacent symbols.

In various aspects of the invention, the subcarriers shown in FIG. 7 may correspond to one or more users. Each user's subcarriers may be distributed contiguously or non-contiguously. The subcarriers may be spaced equally and/or non-equally. Subcarriers may optionally correspond to different sub-space channels. In some aspects of the invention, sub-carrier sets may be distributed (e.g., spread or interleaved) over multiple time periods to provide for time diversity. Sub-carrier sets corresponding to each user may include the same or different numbers of subcarriers. Each set may include equal or unequal sub-carrier spacing. Although subcarriers may be equally spaced in each set, at least two different frequency spacings may be employed relative to different sets. Other variations between sets can include sub-carrier bandwidth. In one aspect of the invention, each user's sub-carrier sets (i.e., subchannels) may be adapted (such as relative to number of sub-carriers, channel coding, sub-carrier weighting, sub-carrier bandwidth, etc.) to provide for adaptive sub-channel loading.

Figure 8A:
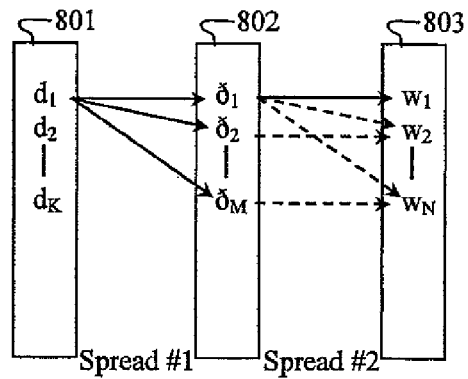
FIG. 8A illustrates a spreading technique that may be employed in the invention.

FIG. 8A is a general illustration of methods and systems that may be provided in the present invention. Each of a set of data symbols 801 is spread such that each data symbol (or data bit) is mapped to a plurality of coded symbols 802. Each of the coded symbols 802 are mapped to a plurality of weights 803, which then may be applied across a diversity-parameter space, such as a plurality of sub-carrier frequencies or sub-space channels. The use of a plurality of spreading algorithms in place of a single large spreading algorithm enables algorithm, or system, reuse with the appropriate buffering and/or process sequencing.

The coded symbols 802 may be generated via any spreading method. Typically, channel coding (such as block coding, convolutional coding, error-check coding, etc.) spreads each data symbol over a small number M of the coded symbols. Up to M-fold diversity is achieved when the coded symbols are mapped onto a diversity-parameter space. If M is a small number, the spreading may not provide sufficient diversity benefits. Increasing the spreading associated with channel coding may not be feasible due to the associated increase in coding complexity. Accordingly, a second spreading algorithm is appropriately adapted to spread the coded symbols 802. If the second spreading algorithm is characterized by a spreading rate or processing gain of O, the total processing gain of both spreading operations can be up to OM.

The invention may provide for multi-level spreading operations, such as to reduce processing complexity and/or increase diversity benefits. Multi-level spreading and/or coding provides a simple architecture for adapting spreading and/or coding. Spreading algorithms of the present invention may employ multi-level or nested coding, such as channel coding and/or spread-spectrum coding. More than two levels may be employed in multi-level spreading. Furthermore, different spreading rates may be employed relative to different channels and/or different numbers of subchannels. Various operations, including coding, may be performed via parallel processing.

Figure 8B:
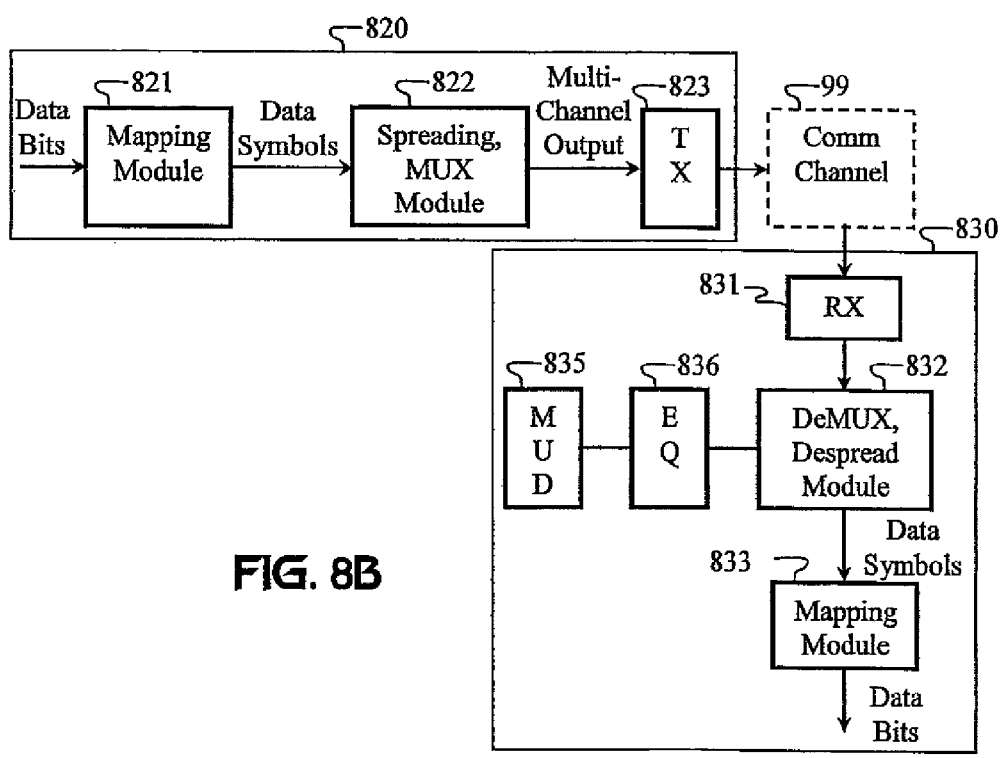
FIG. 8B illustrates basic components of a CI transmitter and a CI receiver.

FIG. 8B illustrates basic components of a CI transmitter 820 and a CI receiver 830. The transmitter 820 includes a mapping module 821, a spreading/multiplexing module 822, and a transmission module 823. The mapping module 821 is adapted to convert an input data bit stream into a data symbol stream. The mapping module 821 may further include any combination of channel coders, spread-spectrum coders, and channelizers. The spreading/multiplexing module 822 is adapted to convert the data symbols into a CI-coded modulated data stream.

CI coding typically spreads the modulated data stream over multiple subchannels, such as any combination of frequency channels, time-domain symbols, spread-spectrum codes, polarizations, sub-space channels, chirps, etc. The spreading/multiplexing module 822 may include any combination of spread-spectrum coders, channel coders, multiple-access coders, multiplexers, sub-carrier generators, and invertible-transform modules. The transmission module 823 is typically any appropriate well-known transmitter configured to adapt an input baseband or intermediate-frequency (IF) signal for transmission into a communication channel 99. The transmission module 823 may include any of various PAPR-reduction designs, such as described in the present disclosure.

A receiver module 831 coupled to the channel 99 converts received signals to IF or baseband. A demultiplexer/despreader module 832 processes digitized receive signals to generate estimates of the transmitted data symbols. The module 832 may optionally include a multi-user detector 835 and/or an equalizer 836. A mapping module 833 is adapted to convert the data symbols to data bits.

The receiver module 831 typically includes any receiver adapted to convert a received signal to a digital IF or baseband signal. Either the receiver module 831 or module 832 may be adapted to remove any guard interval or cyclic prefix. Module 832 is adapted to perform any necessary demultiplexing, multiple-access processing, demodulation, and decoding. Typically, a CI receiver will perform CI decoding. Various types of equalization, interference cancellation, and/or multi-user detection may be performed. The equalizer 836 may be adapted to perform time-domain and/or frequency-domain equalization. Various types of interference cancellation may be employed to mitigate co-channel interference and jamming.

A coded CI signal that includes main and pilot signal portions is preferably generated at the transmitter 820. The receiver 830 is preferably adapted to estimate the frequency response of the fading channel using the coded pilot signals. The detected data signal and the estimated channel frequency response are used to estimate the data signal. The determination can be based on a channel inversion of the frequency response or a new channel estimation combined with maximum likelihood sub-sequence estimation. Other techniques for channel estimation and signal detection for multi-carrier systems may be employed that do not necessarily rely on coded pilot signals.

The invention may utilize an iterative maximum likelihood (ML) estimation method and system to estimate the impulse response of a multipath fading channel and to detect a transmitted signal in OFDM and other multicarrier systems. A system and method may be employed that iteratively finds the joint channel impulse response and the transmitted signal to maximize the likelihood of estimating the correct main signal. The estimation procedure can start with a CI symbol with pilot signals. In this case, an initial maximum likelihood estimate of the impulse response of the channel is obtained from the pilot signals. Based on the initial estimate of the impulse response, a first estimation of the main signal is made. After the initial estimate, both the pilot signals and the estimated main signals are fed back to the channel estimation step to obtain an improved estimation of the channel's impulse response. Then, an updated estimation of the main signal can be obtained using the re-estimated channel impulse response. The iteration procedure stops when improvement on the channel estimation is below a predetermined threshold.

For CI signals that do not include pilot signals, the iteration starts by assigning the initial estimation of the impulse response of the channel to be that of the final estimation of the previous CI symbol or decoded data symbol. The other iteration procedures follow those steps described in the previous paragraph.

The multi-user detector 835 may be adapted to cancel ISI and/or MAI as appropriate. The multi-user detector 836 may provide a hard decision or a soft decision output to a decoder in module 832. In some cases, it is necessary for the multi-user detector 836 to generate a soft decision by combining a hard-decision output with a confidence measurement, such as may be provided during multi-user detection and/or measured with respect to some predetermined expected signal levels. The multi-user detector 836 may be adapted specifically to compensate for loss in orthogonality between symbols (or users) for sub-optimal equalization, such as when the received signal is distorted by deep fades and/or high levels of interference.

The mapping module 833 typically decodes (e.g., maps) the data symbols into corresponding bit values. Various types of channel decoding may be employed, as required. The mapping module may perform iterative feedback operations that may include either or both hard decision and soft decision processing.

Figure 8C:
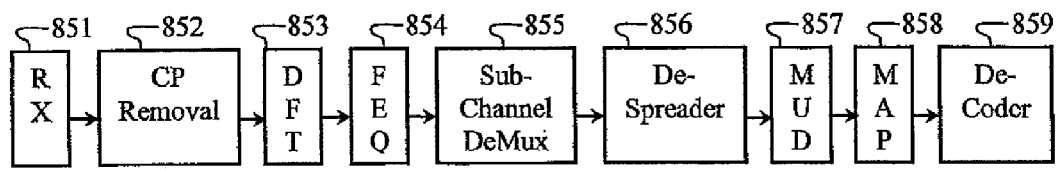
FIG. 8C illustrates a receiver system and method of the invention adapted to process received FD-CI signals.

FIG. 8C illustrates a receiver system and method of the invention adapted to process received FD-CI signals. A receiver module 851 processes received multicarrier signals and generates a down-converted digital signal corresponding to at least one user. A cyclic prefix removal module 852 discards any cyclic prefix or guard interval prepended to the received signal. A filter bank, such as a DFT 853, decomposes the signal into a predetermined set of spectral components. A frequency-domain equalizer (FEQ) 854 is adapted to compensate for channel distortion. The FEQ 854 typically employs some form of channel estimation. A sub-channel demultiplexer 855 processes the equalized sub-channels to produce a plurality of spread data symbol values. The demultiplexer 855 may be adapted to combine each of a plurality of sub-carrier sets or values. A despreader 856 is adapted to provide appropriate de-spreading codes to spread data symbols to produce a plurality of estimated data symbol values. An optional MUD 857 may be used to compensate for ISI, such as due to loss of one or more of the subcarriers. A symbol-mapping module 858 is adapted to map the data symbol values to a set of data bits or a second set of data symbols. The symbol-mapping module 858 may include a decoder. Optionally, a separate decoder 859 is provided, such as to perform bit-level decoding.

Figure 9A:
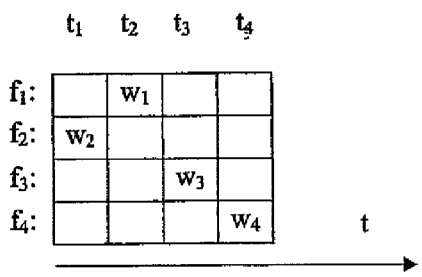
FIG. 9A illustrates a distribution of time interleaved sub-carrier weights over a plurality of frequency-time channels.
Figure 9B:
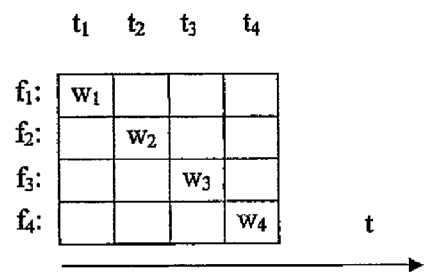
FIG. 9B illustrates a digital-chirp.
Figure 9C:
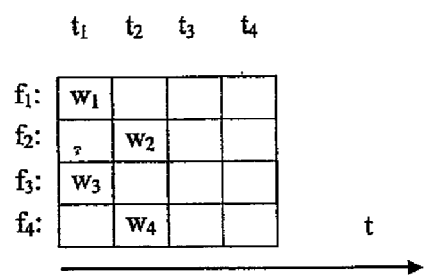
FIG. 9C illustrates a distribution of time interleaved sub-carrier weights that share the same time slots.

FIG. 9A illustrates a distribution of sub-carrier weights $w_n$ over a plurality of frequency-time channels. In particular, the sub-carrier weights $w_n$ are interleaved in time, such as to further reduce impulse noise or compensate for quickly varying channel and/or interference conditions. In FIG. 9B, weights are applied to time-frequency channels in a digital-chirp (i.e., frequency ramp) format. In FIG. 9C, sub-carrier weights may share the same time slots.

The invention can provide for tone hopping on transmitter arrays wherein each transmitter element of the array is provided a subsequent sub-carrier frequency corresponding to a predetermined hopping pattern (e.g., a FHSS code) and hop interval. Multiple carriers transmitted by each element of a transmitter array may be hopped (i.e., provided with a subsequent set of carrier frequencies).

FIG. 10A illustrates a CI transmitter adapted to reduce PAPR of multicarrier signals. A CI symbol generator 301 processes an input data bit stream $d_k$ to generate a sequence of symbols $S_n$ characterized by CI coding. Since CI coding may employ code chips that are similar to orthogonal basis terms in a Fourier transform, a fast algorithm similar to an FFT may be employed for mapping data symbols onto CI codes. The CI symbol generator 301 may employ channel coding, spreading, and/or multiple-access coding.

A sub-carrier generator 302 is adapted to map each of the N symbols $S_n$ onto a plurality of carriers that typically equals N. The number of carriers may be greater or less than the number N of symbols $S_n$. The sub-carrier generator 302 may include an IDFT, an IFFT, a pulse generator, or any other suitable form of sub-carrier generator, e.g., 302.1 to 302.N.

The output coded subcarriers are combined in a combiner 303 including a plurality M of combiner modules 303.1 to 303.M. The combiner modules 303.1 to 303.M may each be adapted to combine a plurality of equally spaced subcarriers. Different numbers of subcarriers may be combined by each combiner module 303.1 to 303.M. In one embodiment of the invention, contiguous subcarriers between unused tones or pilot tones are combined by each of the combiner modules 303.1 to 303.M. In another embodiment of the invention, equally spaced subcarriers distributed over multiple frequency bands are combined in each of the combiner modules 303.1 to 303.M.

Signal outputs from the combiner modules 303.1 to 303.M are characterized by low PAPR due to the CI encoding. Even when amplitude shift-key modulation is employed, the present invention can reduce the effects of PAPR at the power amplifier by synthesizing high-PAPR constellation symbols from combinations of low-PAPR components. Additional PAPR-reduction techniques may be employed, as described in the present disclosure. The signal outputs are provided with a guard interval or cyclic prefix by a guard interval module 304. The guard-interval module 304 may optionally include a plurality of guard-interval modules 304.1 to 304.M. A guard interval corresponding to each combined signal may be generated.

Each of the combined signals is provided to a transmitter module 305. In some cases, CI coding or some other PAPR-reduction process may be applied to the combined signals to ensure low PAPR of the signals prior to amplification. Alternatively, the transmitter module 305 may include a plurality of transmitter modules 305.1 to 305.M adapted to process each of the combined signals. In one aspect of the invention, each transmitter module 305.1 to 305.M includes a power amplifier adapted to separately amplify each of the combined signals. The amplified signals may then be combined in a coupling system, such as an antenna (not shown), a waveguide (not shown), or a multi-port junction (not shown). The transmitter modules 305.1 to 305.M may be provided with separate antennas, or else the transmitter modules 305.1 to 305.M may share one or more antennas.

FIG. 10B illustrates an embodiment of a CI symbol generator 301. Input data symbols $d_k$ are mapped 308 to symbol constellations $d_k$, prior to a CI code transform module 309. The symbol mapping module 308 may provide channel coding, code division multiple access, and/or spread-spectrum coding. The CI code transform module 309 can implement orthogonal basis functions of any invertible transform and provide for any appropriate fast transforms. Similarly, a receiver employing CI decoding may implement a fast transform.

FIG. 10C illustrates an alternative embodiment of a CI transmitter. A multi-carrier generator 311 provides for sub-carrier selection. A combiner 312 including a plurality of combiner modules 312.1 to 312.M combines subsets of the subcarriers to produce a plurality M of CI waveforms. Alternative methods and systems may be used to generate CI waveforms, such as time-domain coding techniques disclosed in Applicant's pending patent application entitled "Time-Domain Applications of Basic Carrier Interferometry Codes for Spectrum Allocation," which is incorporated by reference herein.

A modulator 313 is adapted to impress a vector of data symbols onto the CI waveforms. The modulated signal outputs are provided with a guard interval or cyclic prefix by a guard interval module 314. The guard-interval module 314 may optionally include a plurality of guard-interval modules 314.1 to 314.M. Each of the combined signals is provided to a transmitter module 315. The transmitter module 315 may include a plurality of transmitter modules 315.1 to 315.M adapted to process each of the combined signals.

Figure 11A:
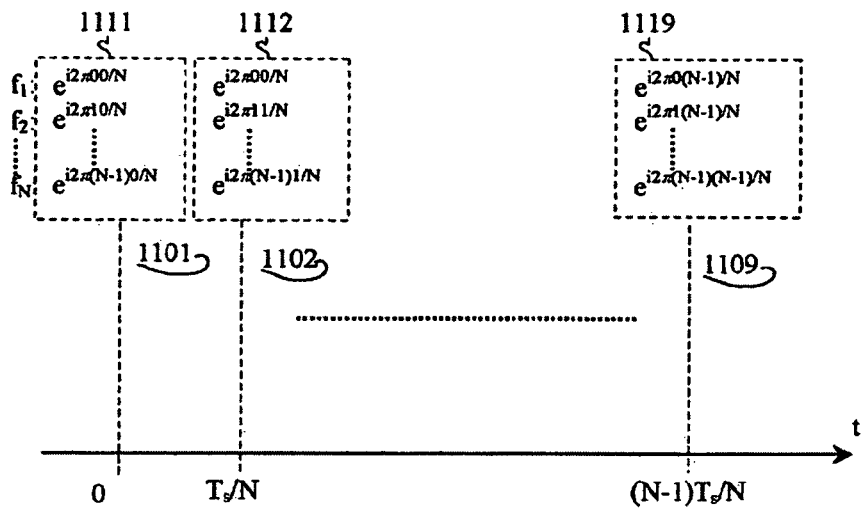
FIG. 11A illustrates a CI pulse train generated from a superposition of equally spaced subcarriers.

FIG. 11A illustrates a CI pulse train consisting of a number N of pulses 1111 to 1119 generated from a superposition of N equally spaced sub-carrier frequencies $f_n=f_1$ to $f_N$. The symbol duration $T_s$ equals the inverse of the subcarrier frequency spacing $f_s$. The pulses 1111 to 1119 are orthogonally spaced in time. That is, the pulses 1111 to 1119 are centered at N instants in time uniformly spaced over the symbol interval $T_s$. Orthogonal positioning of CI pulses is well known in the art, such as described in PCT Patent Application PCT/US99/02838, U.S. Pat. No. 5,955,992, and C. R. Nassar, B. Natarajan, and S. Shattil, "Introduction of carrier interference to spread spectrum multiple access", IEEE Emerging Technologies Symposium, Dallas, Tex., Apr. 12-13, 1999, which are incorporated by reference.

Each pulse in FIG. 11A corresponds to a set of phase offsets (i.e., an orthogonal CI code) applied to the component subcarriers. For example, a first set of codes 1111 applied to the subcarriers produces a superposition of the carriers to produce a first pulse 1101 centered at a first time instant t=0. Similarly, codes 1112 to 1119 generate CI pulses 1102 to 1109, respectively. The generation of CI codes is well known in the art and described in the previously cited publications on CI.

Figure 11B:
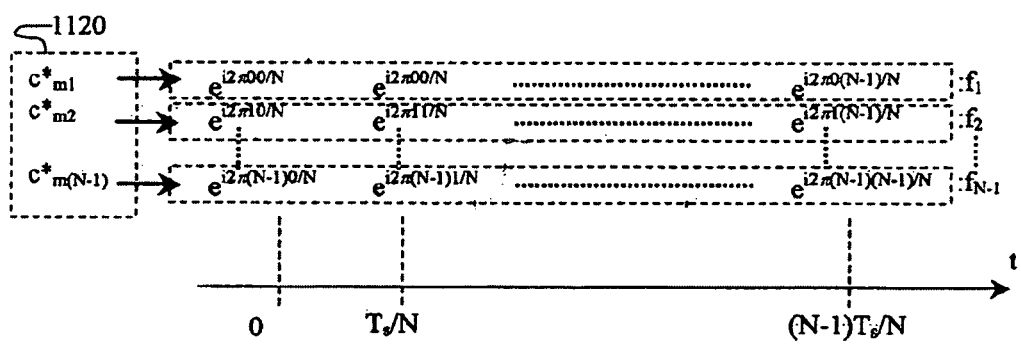
FIG. 11B illustrates a set of decoding symbols applied to CI sub-carriers.

FIG. 11B illustrates a set of decoding symbols 1120 applied to sub-carrier frequencies $f_n=f_1$ to $f_N$. The decode set 1120 typically includes a complex conjugate of at least one of the codes 1111 to 1119. The decode set 1120 is applied to measured sub-carrier weights to recover data symbols impressed onto at least one of the corresponding pulses 1111 to 1119.

CI coding is the process of distributing coded data across multiple sub-carrier frequencies to generate a superposition pulse substantially confined to a narrow pulse interval. CI coding is an invertible transform. Thus, one aspect of the invention recognizes that CI coding may equivalently be applied across multiple CI pulses (or other pulse waveforms) in a symbol interval to isolate or select one or more sub-carrier components.

Figure 11C:
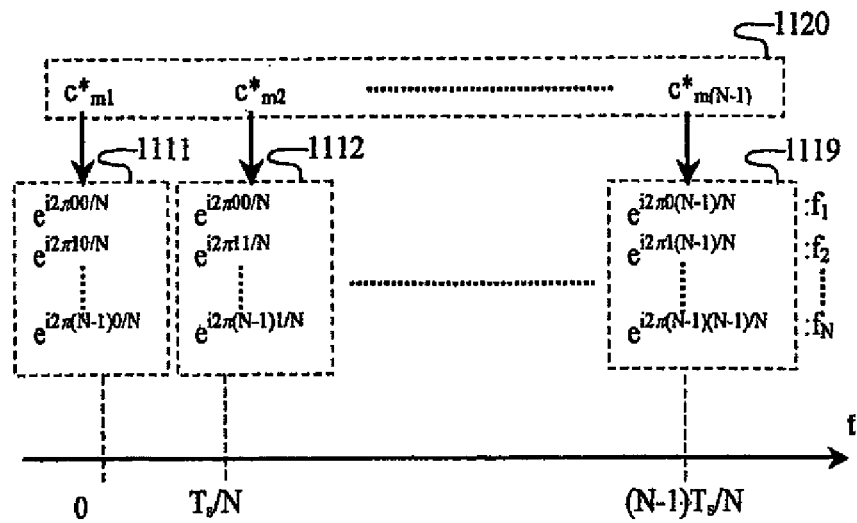
FIG. 11C illustrates a set of decoding symbols applied to a sequence of CI pulses.

FIG. 11C illustrates a set of decoding symbols 1120 applied to CI pulses, which are represented by CI codes 1111 to 1119. The decoding symbols 1120 are applied to the pulse train spanning a symbol duration $T_s$. The resulting waveform corresponds to at least one of the sub-carrier components. For example, if the decoding-symbol set 1120 is the complex conjugate of one of the CI codes 1111 to 1119, the resulting waveform is one of the CI sub-carrier frequencies.

Figure 11D:
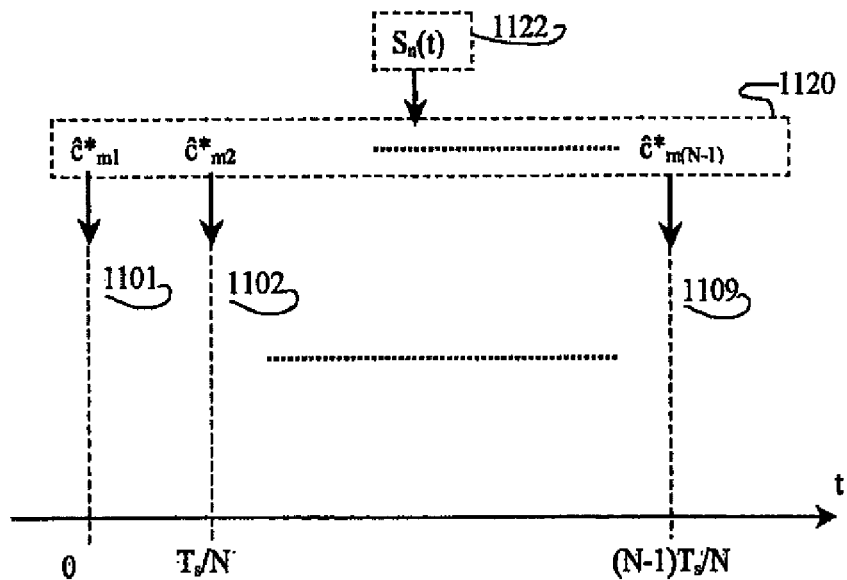
FIG. 11D illustrates how applying CI codes to a predetermined time-domain sequence can control the spectral profile of the sequence.

FIG. 11D illustrates an exemplary method of the invention. A set of uniformly spaced pulses 1101 to 1109 (such as may be generated via CI pulse generation, or some other means) is provided. Desired spectral characteristics may be established by controlling one or more signaling parameters, such as pulse repetition period, number of pulses, and pulse shape.

In a method of the invention, one or more CI codes 1120, including aggregate CI codes (i.e., linear combinations of basic CI codes), may be applied to the pulses 1101 to 1109.

Each CI code chip may multiply, or modulate, a corresponding pulse 1101 to 1109. The resulting time-domain signal is composed of one or more of the pulse signal components (i.e., sub-carrier frequencies) depending on the code 1120. In the event that the code 1120 is an aggregate code, a plurality of orthogonal signals may be generated by cyclically shifting copies of the generated time-domain signal. The appropriate time offsets may be selected based on the number of sub-carrier components, the number of desired orthogonal signals (the maximum number equals the number of components), and/or via sliding correlation. Data symbols 1122 may be modulated onto the resulting time-domain signals or impressed onto the code 1120.

The present invention provides a CI-type modulation scheme that enables different users in a communication system to transmit simultaneously at different data rates (or different effective bandwidths) while providing frequency diversity, low PAPR, and orthogonality between the users. Additionally, the improved modulation scheme permits transmitters within the system to vary their data rates (or effective bandwidths), adapt to changing spectral requirements, and/or adapt to changing channel conditions while preserving low PAPR and orthogonality.

Figure 12:
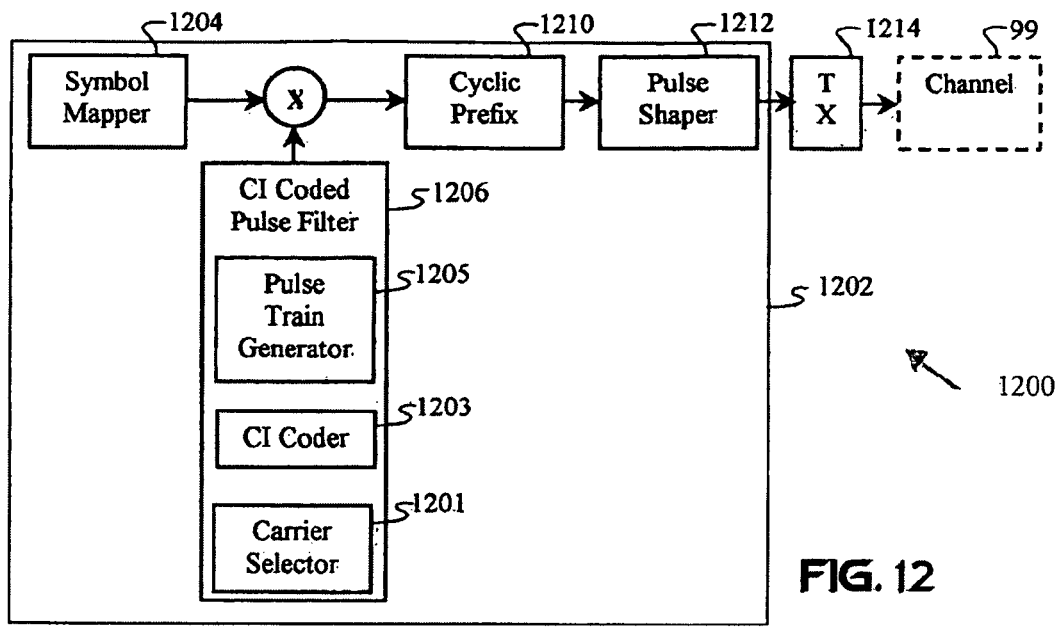
FIG. 12 is a block diagram of a CI transmission system.

FIG. 12 is a block diagram of an exemplary system 1200 in accordance with the present invention. The system 1200 includes one or more transmitters 1202, each corresponding to a particular user and communicating with one or more receivers (not shown) by way of a communication channel 99. The communication channel 99 can be a radio frequency (RF) channel in a multi-user communication system, such as a cellular system, wireless network, mobile radio system, or the like.

Multiple users can simultaneously transmit data over the channel 99. The transmitters 1202 and receivers (not shown) can be fixed or mobile subscriber units and/or base stations. The transmitters 1202 and receivers (not shown) can include suitable combinations of hardware and/or software components for implementing the modulation scheme of the present invention. As shown, the transmitter 1202 illustrated in FIG. 12 includes a symbol-to-time mapping module 1204, a pulse filter 1206 supported by a plurality of sub-modules (such as a pulse-train generator 1205, a CI code generator 1203, and a carrier selector 1201) a cyclic extension device 1210, an optional pulse-shaping filter 1212, and a transmitter module 1214.

The system 1200 is described further herein for the case where users within the CI-type system can have different data rates. Various coding techniques for achieving orthogonal discrimination for different data rates and/or sub-carrier allocations are disclosed. The conditions for maintaining orthogonality, i.e., minimal multiple access interference (MAI), between the different users are also described.

In the subject version of CI signaling, a user's baseband signal begins as a single-carrier phase shift keying (PSK) or quadrature amplitude modulation (QAM) symbol stream. The symbols and/or the data bits that make up the symbols may optionally be provided with coding. The symbols are mapped 1204 to a number of pulse positions per symbol duration corresponding to the number of subcarriers allocated to the user. The symbols are impressed onto time-domain CI waveforms via coded CI pulse filtering 1206. The pulse filter 1206 either applies the time-domain waveform to each mapped symbol, or the pulse filter centers a plurality of time-domain waveforms at the predetermined pulse positions and modulates each waveform with at least one of the data symbols.

The pulse filter 1206 may provide time-domain waveforms generated by a pulse-train generator 1205, a CI coder 1203 adapted to apply one or more CI codes to the pulse train, and a carrier selector 1201 adapted to direct code selection by the CI coder 1203. The repetition of the pulses produced by the pulse-train generator 1205 causes the spectrum of pulse train to be non-zero only at certain sub-carrier frequencies. The codes applied to the pulse train by the CI coder 1203 select a predetermined set of the sub-carrier frequencies.

The pulse filter 1206 may include memory to store time-domain waveforms. The pulse filter 1206 may include signal replicators, delay systems, interleaver, and/or any other appropriate analog or digital components necessary for the generation and/or application of a plurality of time-domain waveforms. The pulse filter 1206 may be adapted to overlay and/or interleave a plurality of modulated time-domain waveforms. The pulse filter 1206 may include a CI pulse-shaping filter, a root-raised cosine filter, an MSK filter, or the like. In another aspect of the invention, the CI coder 1203 may be adapted to provide data-modulated CI codes to the pulse train.

A guard interval or cyclic prefix may optionally be provided to the time-domain signal. The cyclic extension device 1210 may optionally be positioned between the symbol-to-time mapping module 1204 and the pulse filter 1206 or between the optional pulse-shaping filter 1212 and the transmitter module 1214. Optional pulse shaping 1212 may be used to provide the spectrum with a steeper roll off compared to OFDM. The transmitter module 1214 may optionally include filters, such as low-pass filters and/or anti-aliasing filters.

The CI transmissions remain orthogonal as long as: 1) they occupy different sets of subcarriers, which is accomplished by user-specific CI codes, 2) a cyclic extension (or guard period) is added to the transmission to compensate for any channel delay spread, and 3) the signals are synchronized with the receiver in time and frequency.

Figure 13:
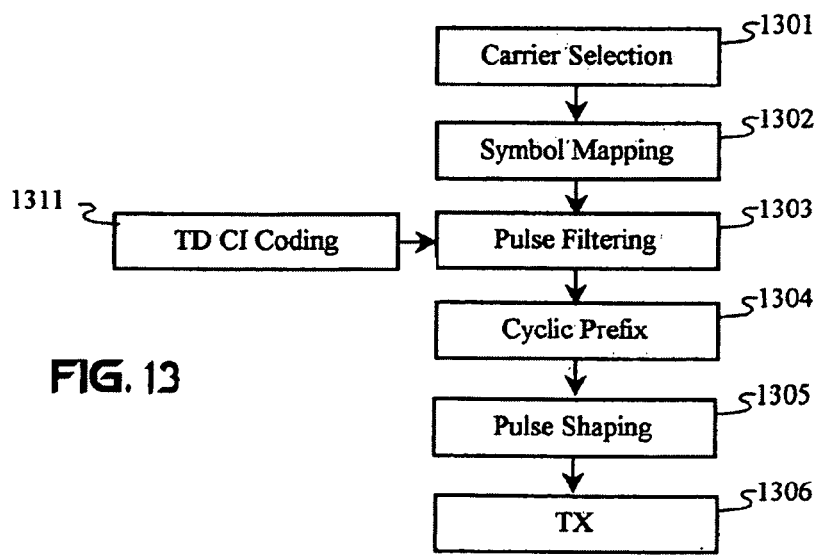
FIG. 13 is a flowchart illustrating the operation of the transmitter shown in FIG. 12.

FIG. 13 shows a flowchart illustrating one possible variation of the operation of the transmitter shown in FIG. 12. For each active user in a communication system, a predetermined set of at least one possible set of subcarriers is selected 1301. Carrier selection 1301 may be adaptive and/or may be in response to measured (and/or estimated) channel conditions, transmission throughput requirements, sub-carrier allocations, etc. Symbol mapping 1302 establishes a number of transmission symbols per symbol interval. Data symbols and/or time-domain waveforms are mapped to predetermined instants in time (i.e., phase spaces) dictated by any combination of the number of subcarriers and the time-domain waveform(s) employed by the transmitter.

Pulse filtering 1303 maps one or more time-domain waveforms (which have a frequency spectrum corresponding to the carrier selection) to the phase spaces. Pulse filtering 1303 may include modulating data symbols onto the waveforms, or equivalently, mapping the waveforms onto symbols allocated to the phase spaces. In exemplary embodiments of the invention, pulse filtering 1303 includes applying time-domain coding 1311 based on CI to a train of pulses. The pulses may be generated from superpositions of subcarriers, or they may be generated using time-domain generation and shaping techniques. Pulse filtering 1303 may include a parallel process of impressing data symbols onto time-shifted (e.g., cyclically shifted) waveforms, followed by combining (e.g., summing) the waveforms.

In some applications in which time-domain waveforms include gaps (or zeros), the process of combining different data-modulated waveforms may be implemented as an interleaving process. Such combining processes may be performed as a serial process. Accordingly, carrier selections may advantageously be made to provide time-domain waveforms with gaps such that combining the time-domain waveforms may be implemented via interleaving and/or other appropriate serial processing.

In step 1304, a guard period (a cyclic extension comprising a prefix, postfix, or both) may be provided prior to, and/or following, pulse filtering 1303. The cyclic prefix step 1304 may be provided before or after pulse shaping 1305. A transmit step 1306 processes the signal for transmission into a communication channel 99.

In step 1303, a user-specific modulation code is applied. The modulation code can be any suitable code meeting the code-assignment conditions disclosed herein. With proper selection of modulation codes, orthogonality between the different users can be maintained, even in multipath conditions, as long as the channel varies slowly with respect to the symbol duration $T_s$. To maintain orthogonality, the symbol duration can be the same for all users. Similarly, different data streams, and/or data symbols corresponding to a particular user may be conveyed with a plurality of different user codes. For example, coded data symbols may be spread over multiple sub-carrier channels in a way that simultaneously achieves enhanced frequency diversity for each data bit and the reduced complexity of frequency-division processing.

The present invention provides for multi-rate transmissions by using user-specific data block and repetition sizes, as well as user-specific modulation codes, thereby providing different data rates to different users and hence a high degree of data rate flexibility. It also preserves a low PAPR. In some applications of the invention, the effects of PAPR may be further reduced by separately amplifying (and optionally, providing for separate transmission) a plurality of the modulated time-domain waveforms and/or sets of waveforms.

Variations to the systems and methods of the invention may be made in accordance with the prior art without departing from the scope of the invention. Similarly, other aspects of related forms of communication (e.g., multi-carrier and/or single-carrier communications) may be combined with the present invention. Furthermore, the order of the various illustrated components and steps may be changed without departing from the scope of the invention.

Figure 14:
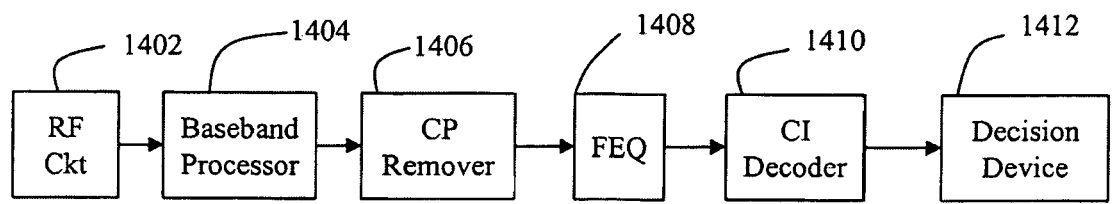
FIG. 14 shows a CI receiver.

FIG. 14 shows a first receiver structure in which channel equalization is performed prior to correlating the signal with a user-specific modulation code. The first receiver includes an RF circuit 1402 adapted to perform RF-to-baseband conversion. The RF circuit 1402 may include an A/D converter sampling circuit (not shown), a baseband filter 1404, a cyclic extension remover 1406, an equalizer 1408, a decoder 1410, and a symbol decision device 1412. The decoder 1410 and symbol decision device 1412 perform their functions for specific users.

The received signal is down converted to a complex baseband signal, filtered (image rejection, adjacent channel rejection, avoid aliasing), and digitized by the RF circuit 1402. The baseband signal may be baseband filtered, such as by a filter 1404 matched to the transmit pulse-shaping filter. The cyclic prefix remover 1406 removes any cyclic extension or guard interval. The frequency domain equalization module 1408 equalizes the received signals for each user's (corresponding to the number of user signals the receiver is adapted to process) channel response. As each user is allocated a unique set of orthogonal subcarriers (due to the modulation codes), all users can be equalized simultaneously in the frequency domain using only one N-point transform. However, the equalizer coefficients are different for each user and are applied only to the sub-carriers occupied by that user. Thus, the equalizer 1408 may perform a combination of common processing and user-specific processing. Alternatively the equalization can be based on other techniques such as linear transversal time-domain equalization, decision feedback equalization, maximum likelihood sequence estimation, iterative equalization, inter-symbol-interference (ISI) cancellation, and/or turbo equalization.

For each user, the equalized signal is then code correlated by the CI decoder 1410. Channel decoding, such as Forward Error Correction (FEC) decoding may be provided if error correction coding was used in the transmitter. A decision device 1412 may be adapted to perform a logic decision based on the estimated symbols to determine the values of the symbols.

Variations to the receiver processor may be provided without departing from the spirit and scope of the invention. For example, in an alternative receiver architecture, the correlation with user-specific codes is performed prior to channel equalization.

In various designs of the receiver, time-domain codes (such as CI codes illustrated herein) may be applied to a received time-domain signal to extract predetermined sub-carrier values. Thus, in the same way that time-domain CI coding may be used to map data symbols onto individual sub-carrier frequencies (thus, eliminating the need for typical IFFT processes at the transmitter), CI decoding may be provided in place of any FFT process, such as typically performed at the receiver.

The preceding description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof are intended to encompass both structural and functional equivalents thereof. Additionally, it is intended that such equivalents include both currently known equivalents as well as equivalents developed in the future, i.e., any elements developed that perform the same function, regardless of structure, Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, codes, and the like represent various processes which may be substantially represented in computer readable medium and so executed by a computer or processor, whether or not such computer or processor is explicitly shown.

The functions of the various elements shown in the drawings, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and nonvolatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the description hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined herein resides in the fact that the functionalities provided by the various recited means are combined and brought together in the manner which the operational descriptions call for. Applicant thus regards any means which can provide those functionalities as equivalent as those shown herein.

The invention claimed is:

1. A method of transmitting data, comprising:
   mapping a predetermined amount of data to a predetermined set of subchannels;
   performing carrier interferometry (CI) coding to provide at least one predetermined combination of data spreading and channel coding to obtain a plurality of input symbols;
   associating the input symbols with at least one set of subchannels;
   generating a corresponding time-domain sequence representing a data-payload signal, based on said associating; and
   selecting one or more unloaded subchannels to be used for transmitting at least one peak-to-average power (PAPR) reduction signal.

2. The method according to claim 1, wherein said selecting one or more unloaded subchannels comprises selecting and generating at least one unloaded subchannel when the time-domain sequence exceeds a predetermined power threshold.

3. The method according to claim 2, further comprising:
   generating at least one PAPR-reduction signal in at least one of said one or more unloaded subchannels; and
   combining the at least one PAPR-reduction signal with the time-domain sequence until the time-domain sequence power drops below a predetermined threshold.

4. The method according to claim 1, wherein said mapping includes generating one or more unloaded subchannels by not loading subchannels that are subject to adverse channel conditions.

5. The method according to claim 1, wherein said selecting comprises maintaining the data-payload signal below a predetermined clipping threshold.

6. The method according to claim 1, further comprising:
   combining the at least one PAPR-reduction signal with at least one of the plurality of input symbols and the data-payload signal.

7. The method according to claim 1, wherein said mapping comprises:
   ceasing to load at least one predetermined subchannel that is below at least one predetermined channel-quality metric; and
   wherein said selecting comprises selecting said predetermined subchannel for transmission of at least one PAPR-reduction signal.

8. The method according to claim 1, wherein said mapping comprises:
   allocating a predetermined number of data bits to at least one of a set of subchannels including space-frequency subchannels, space-time subchannels, CI phase-space subchannels, spatial sub-channels, or polarization subchannels.

9. The method according to claim 1, wherein said mapping comprises:
   selecting which of a plurality of sequence permutations of the predetermined number of data bits results in the greatest reduction of PAPR in the data-payload signal.

10. A method of transmitting data, comprising:
    spreading at least one data sequence with at least one set of carrier interferometry (CI) codes to thereby generate at least one set of CI-coded symbols;
    mapping the at least one set of CI-coded symbols onto a plurality of subcarriers;
    combining sets of the plurality of carriers to produce a plurality of CI-coded time-domain sequences that are characterized by low peak-to-average power ratio (PAPR); and
    amplifying the plurality of CI-coded time-domain sequences to thereby obtain a plurality of amplified signals.

11. The method according to claim 10, further comprising:
    combining the plurality of amplified signals to obtain a combined signal.

12. The method according to claim 11, further comprising:
    transmitting the combined signal over a transmission medium.

13. A method of generating a multi-carrier signal, the method comprising:
    generating a sequence of pulse waveforms having a predetermined spectrum;
    generating at least one carrier interferometry (CI) code; and
    impressing the at least one CI code onto the sequence of pulse waveforms to shape the predetermined spectrum, to thus obtain an encoded sequence of pulse waveforms.

14. The method according to claim 13, further comprising:
    modulating the encoded sequence of pulse waveforms with data, to obtain a modulated signal.

15. The method according to claim 14, further comprising:
    transmitting the modulated signal over a multi-carrier communication channel.

16. A non-transitory computer-readable medium containing instructions that, when executed by at least one processor, cause the at least one processor to implement a method of transmitting data, the method comprising:
    mapping a predetermined amount of data to a predetermined set of subchannels;
    performing carrier interferometry (CI) coding to provide at least one predetermined combination of data spreading and channel coding to obtain a plurality of input symbols;
    associating the input symbols with at least one set of subchannels;
    generating a corresponding time-domain sequence representing a data-payload signal, based on said associating; and
    selecting one or more unloaded subchannels to be used for transmitting at least one peak-to-average power (PAPR) reduction signal.

17. The medium according to claim 16, wherein said selecting one or more unloaded subchannels comprises selecting and generating at least one unloaded subchannel when the time-domain sequence exceeds a predetermined power threshold.

18. The medium according to claim 17, wherein the method further comprises:
generating at least one PAPR-reduction signal in at least one of said one or more unloaded subchannels; and
combining the at least one PAPR-reduction signal with the time-domain sequence until the time-domain sequence power drops below a predetermined threshold.

19. The medium according to claim 16, wherein said mapping includes generating one or more unloaded subchannels by not loading subchannels that are subject to adverse channel conditions.

20. The medium according to claim 16, wherein said selecting comprises maintaining the data-payload signal below a predetermined clipping threshold.

21. The medium according to claim 16, wherein the method further comprises:
combining the at least one PAPR-reduction signal with at least one of the plurality of input symbols and the data-payload signal.

22. The medium according to claim 16, wherein said mapping comprises:
ceasing to load at least one predetermined subchannel that is below at least one predetermined channel-quality metric; and
wherein said selecting comprises selecting said predetermined subchannel for transmission of at least one PAPR-reduction signal.

23. The medium according to claim 16, wherein said mapping comprises:
allocating a predetermined number of data bits to at least one of a set of subchannels including space-frequency subchannels, space-time subchannels, CI phase-space subchannels, spatial sub-channels, or polarization sub-channels.

24. The medium according to claim 16, wherein said mapping comprises:
selecting which of a plurality of sequence permutations of the predetermined number of data bits results in the greatest reduction of PAPR in the data-payload signal.

25. A non-transitory computer-readable medium containing instructions that, when executed by at least one processor, cause the at least one processor to implement a method of transmitting data, the method comprising:
spreading at least one data sequence with at least one set of carrier interferometry (CI) codes to thereby generate at least one set of CI-coded symbols;
mapping the at least one set of CI-coded symbols onto a plurality of subcarriers;
combining sets of the plurality of carriers to produce a plurality of CI-coded time-domain sequences that are characterized by low peak-to-average power ratio (PAPR); and
amplifying the plurality of CI-coded time-domain sequences to thereby obtain a plurality of amplified signals.

26. The medium according to claim 25, wherein the method further comprises:
combining the plurality of amplified signals to obtain a combined signal.

27. The medium according to claim 26, wherein the method further comprises:
transmitting the combined signal over a transmission medium.

28. A non-transitory computer-readable medium containing instructions that, when executed by at least one processor, cause the at least one processor to implement a method of generating a multi-carrier signal, the method comprising:
generating a sequence of pulse waveforms having a predetermined spectrum;
generating at least one carrier interferometry (CI) code; and
impressing the at least one CI code onto the sequence of pulse waveforms to shape the predetermined spectrum, to thus obtain an encoded sequence of pulse waveforms.

29. The medium according to claim 28, wherein the method further comprises:
modulating the encoded sequence of pulse waveforms with data, to obtain a modulated signal.

30. The medium according to claim 29, wherein the method further comprises:
transmitting the modulated signal over a multi-carrier communication channel.

\* \* \* \* \*

UNITED STATES PATENT AND TRADEMARK OFFICE
CERTIFICATE OF CORRECTION

| | | |
|---|---|---|
| PATENT NO. | : 8,098,751 B2 | Page 1 of 1 |
| APPLICATION NO. | : 12/177619 | |
| DATED | : January 17, 2012 | |
| INVENTOR(S) | : Shattil | |

It is certified that error appears in the above-identified patent and that said Letters Patent is hereby corrected as shown below:

On the Title page, item (75), under "Inventor", Line 1, delete "Steve Shattil," and insert -- Steve J. Shattil, --.

On the Title page, item (56), under "Other Publications", Line 3, delete "VTS-FAII VTC" and insert -- VTS-FALL VTC --.

On the Title page, item (56), under "Other Publications", Line 7, delete "Communciations" and insert -- Communications --.

On the Title page, item (56), under "Other Publications", Line 9, delete "VCT 2001" and insert -- VTC 2001 --.

Column 1, line 8, delete "10/730,452, which" and insert -- 10/730,452, filed Dec. 8, 2003 (now U.S. Pat. No. 7,418,043), which --.

Column 32, line 9, in Claim 8, delete "sub-channels," and insert -- subchannels, --.

Column 33, line 38, in Claim 23, delete "sub-channels," and insert -- subchannels, --.

Signed and Sealed this
Third Day of July, 2012

David J. Kappos
*Director of the United States Patent and Trademark Office*